(12) United States Patent
Haase et al.

(10) Patent No.: US 12,566,288 B2
(45) Date of Patent: Mar. 3, 2026

(54) LIGHT COUPLING ELEMENT

(71) Applicant: 3M INNOVATIVE PROPERTIES COMPANY, St. Paul, MN (US)

(72) Inventors: Michael A. Haase, St. Paul, MN (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 795 days.

(21) Appl. No.: 17/606,120

(22) PCT Filed: May 19, 2020

(86) PCT No.: PCT/IB2020/054739
§ 371 (c)(1),
(2) Date: Oct. 25, 2021

(87) PCT Pub. No.: WO2020/240346
PCT Pub. Date: Dec. 3, 2020

(65) Prior Publication Data
US 2022/0299695 A1 Sep. 22, 2022

Related U.S. Application Data

(60) Provisional application No. 62/852,637, filed on May 24, 2019.

(51) Int. Cl.
F21V 8/00 (2006.01)

(52) U.S. Cl.
CPC ......... G02B 6/0028 (2013.01); G02B 6/0031 (2013.01); G02B 6/0088 (2013.01)

(58) Field of Classification Search
None
See application file for complete search history.

(56) References Cited

U.S. PATENT DOCUMENTS 9,482,827 B2 11/2016 Haase
2005/0218305 A1* 10/2005 Tsukamoto .............. G02B 6/43
250/216

(Continued)

FOREIGN PATENT DOCUMENTS

EP 2778868 9/2014
JP 2004-226430 8/2004

(Continued)

OTHER PUBLICATIONS

PRIZM®, "LightTurn® Connector", US Conec, [retrieved from the internet on Dec. 7, 2018], URL: <http://www.usconec.com/products/ferrules/prizm-lightturn_ferrule.htm>, 3 pages.

(Continued)

*Primary Examiner* — Chris H Chu
(74) *Attorney, Agent, or Firm* — Clifton F. Richardson

(57) ABSTRACT

A light coupling element including a plurality of waveguide attachment features and a light redirecting member is described. Each attachment feature has an entrance end opposite a terminal end. The entrance ends are arranged at a pitch Pe. The light redirecting member is disposed closer to the terminal ends, and farther from the entrance ends, and includes an input surface, a reflecting side and an exit surface. When a waveguide is attached at each attachment feature, a central light ray emitted by each waveguide enters the light redirecting member through the input surface, is redirected by the reflecting side and exits the light redirecting member at the exit surface, the central light ray intersecting the exit surface at an exit point, each attachment feature corresponding to a different exit point at the exit surface. The exits points are arranged at a pitch Px not equal to Pe.

9 Claims, 16 Drawing Sheets

(56)  References Cited

U.S. PATENT DOCUMENTS

| | | | | |
|---|---|---|---|---|
| 2009/0285533 A1* | 11/2009 | Hiroi | .................... | G02B 6/3664 |
| | | | | 385/65 |
| 2014/0177266 A1* | 6/2014 | Katakura | ................. | G02B 6/00 |
| | | | | 362/574 |
| 2017/0242205 A1 | 8/2017 | Lin | | |
| 2021/0333480 A1* | 10/2021 | Childers | ............... | G02B 6/368 |

FOREIGN PATENT DOCUMENTS

| | | |
|---|---|---|
| JP | 2006-126373 | 5/2006 |
| JP | 2008-015224 | 1/2008 |
| JP | 2008-134444 | 6/2008 |
| JP | 2016-057383 | 4/2016 |
| WO | WO 2012-017263 | 2/2012 |
| WO | WO 2014-055226 | 4/2014 |
| WO | WO 2015-094811 | 6/2015 |
| WO | WO 2017-066018 | 4/2017 |
| WO | WO 2017-066022 | 4/2017 |
| WO | WO 2017-066135 | 4/2017 |
| WO | WO 2018-044565 | 3/2018 |
| WO | WO 2019-175702 | 9/2019 |
| WO | WO 2020-003124 | 1/2020 |

OTHER PUBLICATIONS

International Search Report for PCT International Application No. PCT/IB2020/054739, mailed on Aug. 11, 2020, 4 pages.

* cited by examiner

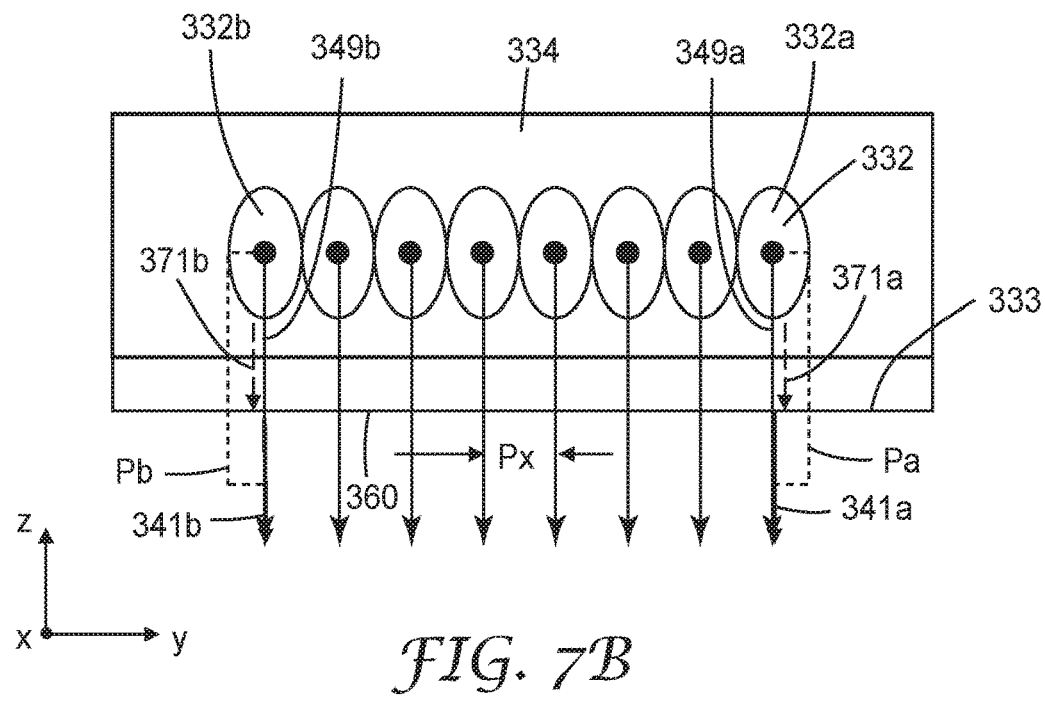
*FIG. 7B*
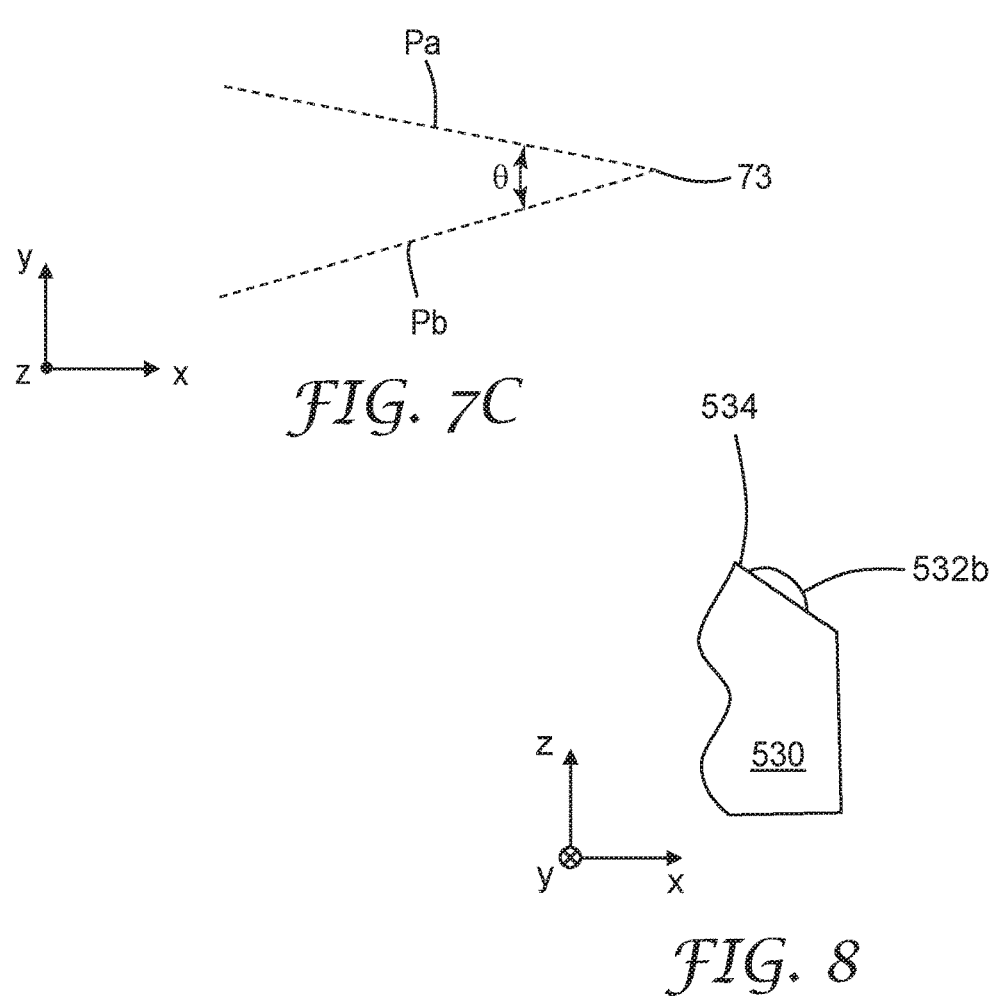
*FIG. 7C*
*FIG. 8*

LIGHT COUPLING ELEMENT

CROSS REFERENCE TO RELATED APPLICATIONS

This application is a national stage filing under 35 U.S.C. 371 of PCT/IB2020/054739, filed May 19, 2020, which claims the benefit of Provisional Application No. 62/852,637, filed May 24, 2019, the disclosures of which are incorporated by reference in their entirety herein.

BACKGROUND

Optical connectors can be used for optical communications in a variety of applications including telecommunications networks, local area networks, data center links, and internal links in computer devices.

SUMMARY

In some aspects of the present description, a light coupling element including a light redirecting member and a plurality of waveguide attachment features for receiving and permanently attaching to a plurality of optical waveguides is provided. Each waveguide attachment feature includes an entrance end opposite a terminal end. The entrance ends of the attachment features are arranged at a pitch Pe. The light redirecting member is disposed closer to the terminal ends, and farther from the entrance ends, of the attachment features and includes an input surface, a reflecting side and an exit surface such that when an optical waveguide is received and permanently attached at each attachment feature, a central light ray emitted by each optical waveguide enters the light redirecting member through the input surface as an input central ray, is redirected by the reflecting side into a redirected central light ray and exits the light redirecting member at the exit surface as an output central light ray. The output central light ray intersects the exit surface at an exit point. Each attachment feature corresponds to a different exit point at the exit surface. The exits points corresponding to the attachment features are arranged at a pitch Px not equal to Pe. In some embodiments, Px>Pe. In some embodiments, Px<Pe. In some embodiments, the terminal ends of the attachment features are arranged at a pitch Pt substantially equal to Pe. In some embodiments, the terminal ends of the attachment features are arranged at a pitch Pt substantially equal to Px. In some embodiments, the terminal ends of the attachment features are arranged at a pitch Pt, where Pe>Pt>Px.

In some aspects of the present description, a light coupling element including a light redirecting member and a plurality of grooves generally extending along a first direction and arranged along an orthogonal second direction for receiving and aligning a plurality of optical waveguides is provided. The light redirecting member includes an input side for receiving light from an optical waveguide received and aligned in a groove in the plurality of grooves; and a light redirecting surface. An optical waveguide is received and aligned in a groove and emits an input central light ray, the input central light ray being received by the light redirecting surface from the input side along an incident direction, the light redirecting surface changing the direction of the received light to a different redirected direction, the incident and redirected directions defining a propagation plane corresponding to the groove. The propagation planes corresponding to at least two different grooves define an angle $\theta$ therebetween greater than about 2 degrees.

In some aspects of the present description, a light coupling element including substantially coplanar first and second grooves for receiving and aligning respective first and second optical waveguides, and first and second light redirecting surfaces corresponding to the respective first and second grooves is provided. When first and second optical waveguides are received and aligned in the respective first and second grooves and emit respective first and second input central light rays, the first and second light redirecting surfaces receive and reflect the input central light rays into respective first and second redirected central light rays so that the redirected central light rays exit the light coupling element as respective first and second output central light rays. The first and second input central light rays define an angle $\alpha 1$ therebetween greater than about 2 degrees. The first input and redirected central light rays define an angle $\beta 1$ therebetween greater than about 30 degrees. The second input and redirected central light rays define an angle $\beta 2$ therebetween greater than about 30 degrees. The first and second output central light rays define an angle $\alpha 2$ therebetween less than about 1 degree.

In some aspects of the present description, a light coupling element including substantially coplanar first and second grooves for receiving and aligning respective first and second optical waveguides, and first and second light redirecting surfaces corresponding to the respective first and second grooves is provided. When first and second optical waveguides are received and aligned in the respective first and second grooves and emit respective first and second input central light rays, the first and second light redirecting surfaces receive and reflect the input central light rays into respective first and second redirected central light rays so that the redirected central light rays exit the light coupling element as respective first and second output central light rays. The first and second input central light rays define an angle $\alpha 1$ therebetween less than about 1 degree. The first input and redirected central light rays define an angle $\beta 1$ therebetween greater than about 30 degrees. The second input and redirected central light rays define an angle $\beta 2$ therebetween greater than about 30 degrees. The first and second output central light rays define an angle $\alpha 2$ therebetween greater than about 2 degrees.

In some aspects of the present description, a light coupling element including first and second optical fiber supports, and first and second curved surface portions projecting from a substantially planar surface and configured to change direction of light received from optical fibers supported by the first and second optical fiber supports is provided. The first and second curved surface portions intersect the substantially planar surface at substantially oval shaped respective first and second borders. Each border includes a shorter minor axis orthogonal to a longer major axis. The longer major axes of the first and second borders define an angle $\delta$ therebetween greater than about 2 degrees. In some embodiments, each of the first and second curved surface portions has an axis of revolution. In some embodiments, for each of the first and second curved surface portions and the corresponding first and second optical fiber supports, the curved surface portion is configured to receive an input central light ray emitted by an optical fiber received and aligned in the optical fiber support along an incident direction intersecting the curved surface portion at an incident location, the curved surface portion defining a first principal direction at the incident location corresponding to a direction along which the curved surface portion comprises a minimum curvature, the first principal direction substantially parallel to the longer major axis of the border of the curved surface portion.

In some aspects of the present description, a light coupling element including a plurality of optical waveguide supports generally extending along a first direction and arranged along an orthogonal second direction for receiving and aligning a plurality of optical waveguides, and including a plurality of light redirecting surfaces is provided. Each light redirecting surface has an axis of revolution and is configured to receive an input central light ray emitted by an optical waveguide received and aligned in a corresponding optical waveguide support along an incident direction. The incident direction and the axis of revolution define an incident plane corresponding to the light redirecting surface. The incident planes corresponding to at least two different light redirecting surfaces define an angle $\omega$ therebetween greater than about 2 degrees.

In some aspects of the present description, a light coupling element including a plurality of optical waveguide supports generally extending along a first direction and arranged along an orthogonal second direction for receiving and aligning a plurality of optical waveguides, and including a plurality of light redirecting surfaces is provided. Each light redirecting surface is configured to receive an input central light ray emitted by an optical waveguide received and aligned in a corresponding optical waveguide support along an incident direction intersecting the light redirecting surface at an incident location. The light redirecting surface defines a first principal direction at the incident location corresponding to a direction along which the light redirecting surface has a minimum curvature. The incident and first principal directions define a first plane. The first planes corresponding to at least two different light redirecting surfaces define an angle $\Omega$ therebetween greater than about 2 degrees.

BRIEF DESCRIPTION OF THE DRAWINGS

FIGS. 7A-7B are schematic top and end views, respectively, of another light coupling element;

FIG. 7C is a schematic illustration of intersecting propagation planes of the light coupling element of FIGS. 7A-7B;

FIG. 8 is a schematic side view of a portion of a light redirecting member;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, a light coupling element, such as an optical ferrule, is adapted to couple an array of generally parallel optical waveguides arranged at a first pitch to an array of light beams (e.g., directed to an array of optical elements such as light sources or light detectors) arranged at a different second pitch. For example, both ribbon cables and arrays of optical elements that may receive light from, or transmit light to, the ribbon cables commonly use a pitch of about 250 microns. However, it may be desired for a light coupling element to utilize grooves, or other waveguide alignment or attachment features or supports, having a pitch (e.g., at an entrance end of the grooves) greater than about 250 microns (e.g., about 265 microns) for receiving and aligning optical fibers from a ribbon cable since this can provide improved alignment precision. The improved alignment precision from utilizing a larger groove pitch can result from the following: For attachment to the light coupling element, the fibers of the ribbon cable are typically separated, and polymer buffer layers surrounding the fibers are typically mechanically stripped from the ends of the fibers. In the stripping process, the buffers may become misshaped and enlarged beyond a nominal 245 to 250 micron diameter. These misshaped buffers can be prevented from contacting the buffers of adjacent fibers, and hence from interfering with precise alignment in the grooves, by bonding the fibers in the grooves at a larger pitch (e.g., about 265 microns). It has been found that light coupling elements can be configured to efficiently optically couple optical fibers having a first pitch (e.g., about 265 microns when received and aligned in the grooves) to an optical component including optical elements (e.g., an array of light sources or an array of light detectors) arranged at a different second pitch (e.g., about 250 microns).

In some embodiments, it may be desired for a light coupling element to utilize grooves having a pitch smaller than a pitch of optical elements on a substrate, for example. This may be desired, for example, for coupling optical fibers arranged at a smaller than a conventional pitch to an optical component having optical elements arranged at a conventional pitch or for coupling optical fibers arranged at a conventional pitch to an optical component having optical elements arranged at a larger than conventional pitch (e.g., a legacy component).

Figure 1A:
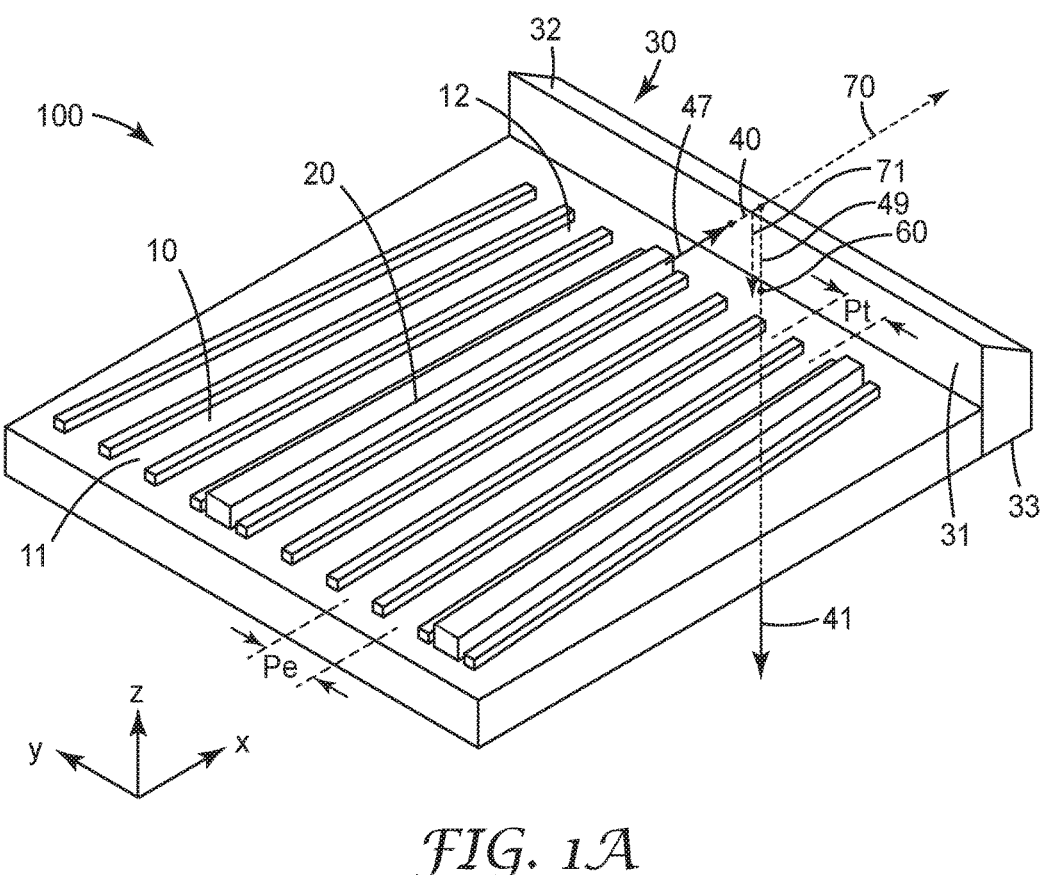
FIG. 1A is a schematic perspective view of a light coupling element.
Figure 1B:
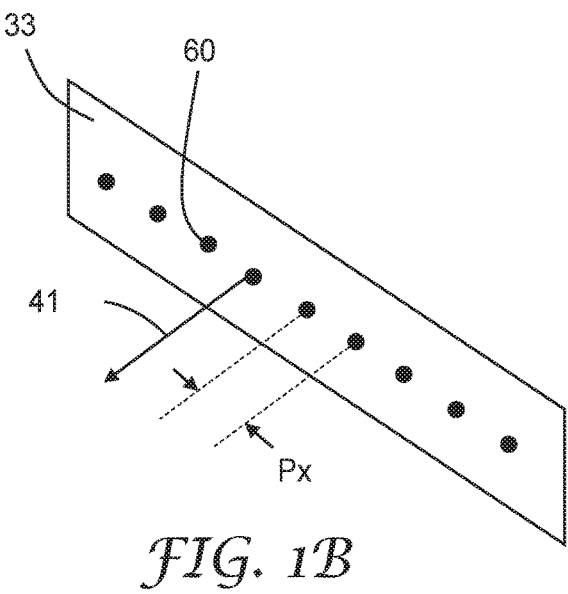
FIG. 1B is a schematic perspective view of an exit surface of the light coupling element of FIG. 1A.

FIG. 1A is a schematic perspective view of a light coupling element 100 and FIG. 1B is a schematic perspective view of an exit surface 33 of the light coupling element 100. The light coupling element 100 includes a plurality of features 10 for receiving and, in some embodiments, permanently attaching to a plurality of optical waveguides 20. Features 10 may be supports for optical waveguides or optical fibers and/or features 10 may be waveguide alignment features and/or waveguide attachment features. For example, the plurality of features 10 may be a plurality of grooves generally extending along a first direction (x-direction) and arranged along an orthogonal second direction (y-direction) for receiving and aligning a plurality of optical waveguides 20. The grooves may be gradually angled toward or away from one another as they extend from an entry end to a terminal end, and still be considered to generally extend along a first direction. For example, each groove may make an angle of no more than 30 degrees (or no more than 20 degrees, or no more than 15 degrees, or no more than 10 degrees) with a same first direction. In some embodiments, the grooves are substantially coplanar. For example, the grooves may be disposed generally a plane parallel to the x-y plane, and a direction along the length of each groove (e.g., an optical axis along an optical fiber received in and supported by the groove) may make an angle of no more than 30 degrees (or no more than 20 degrees, or no more than 15 degrees, or no more than 10 degrees) with the plane.

Each feature 10 includes an entrance end 11 opposite a terminal end 12. The entrance ends of the features 10 are arranged at a pitch Pe, and the terminal ends 12 of the features 10 are arranged at a pitch Pt. The light coupling element 100 includes a light redirecting member 30 disposed closer to the terminal ends 12, and farther from the entrance ends 11, of the features 10 and includes an input surface 31, a reflecting side 32, which may be referred to as a redirecting surface, and an exit surface 33 such that when an optical waveguide 20 is received and permanently attached at each feature 10, a central light ray 47 emitted by each optical waveguide 20 enters the light redirecting member 30 through the input surface 31 as an input central light ray 40, is redirected by the reflecting side 32 into a redirected central light ray 49 and exits the light redirecting member 30 at the exit surface 33 as an output central light ray 41. The redirected central light ray 49 and the output central ray 41 intersect the exit surface 33 at an exit point 60. The positions of the exit points 60 on the exit surface 33 are schematically indicated by the array of dots in FIG. 1B. Each feature 10 corresponds to a different exit point 60 at the exit surface 33. The exits points 60 corresponding to the features 10 are arranged at a pitch Px which is not equal to Pe. In some embodiments, the exit surface 33 is substantially planar (e.g., as schematically illustrated in FIG. 1B).

Figure 1C:
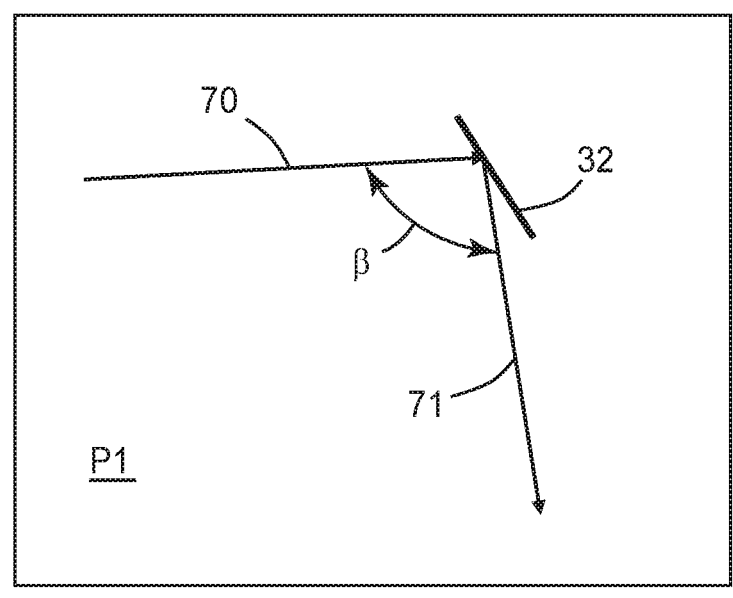
FIG. 1C is a schematic illustration of a propagation plane defined by incident and redirected directions.

The input central light ray 40 is received by the reflecting side 32 from the input surface 31 along an incident direction 70. The reflecting side 32 changes the direction of the received light to a different redirected direction 71. The incident and redirected directions 70 and 71 define a propagation plane P1 and define an angle β therebetween as schematically illustrated in FIG. 1C. In some embodiments, as described further elsewhere herein (see, e.g., FIGS. 6A-7C), for each optical waveguide and corresponding attachment feature, the input central light ray emitted by the optical waveguide is received by the light directing side from the input side along an incident direction, the light redirecting surface changes the direction of the received light to a different redirected direction, the incident and redirected directions define a propagation plane corresponding to the attachment feature, and the propagation planes corresponding to at least two different attachment features define an angle θ therebetween greater than about 2 degrees or in any of the ranges described elsewhere herein.

The term input light ray may be used to refer to a light ray that has been input into a light coupling element (e.g., after being emitted by an optical waveguide and transmitted into a light redirecting member of the light coupling element) before the light ray is redirected by a reflective surface; the term redirected light ray may be used to refer to the light ray after it has been redirected by the reflective surface and before it exits the light coupling element; and the term output light ray may be used to refer to the light ray after it exits the light coupling element. Light leaving an optical fiber may undergo refraction at a fiber interface with an adhesive, or at the adhesive interface with the light coupling element, or both. The input central light ray 40 propagates along the incident direction 70 just after the ray enters the light coupling element. The redirected central ray 49 propagates along the redirected direction 71 after it is redirected by the reflecting side 32 and before it exits the light coupling element. The directions of the output central ray 41 and the redirected central ray 49 may differ due to refraction at the exit surface 33.

The reflecting side 32 may be substantially planar as schematically illustrated in FIG. 1A. In some embodiments, the reflecting side 32 includes a plurality of curved surface portions or a plurality of light redirecting surfaces (e.g., curved sides). For example, as described further elsewhere herein (see, e.g., FIG. 9), in some embodiments, the plurality of waveguide attachment features include first and second attachment features, the reflecting side 32 includes first and second curved surface portions projecting from a substantially planar surface (e.g., a surface having a radius of curvature of at least 5, 10, 20, 50, or 100 times a largest dimension of the surface) and configured to change the direction of light received from respective first and second optical waveguides supported by the first and second attachment features, the first and second curved surface portions intersect the substantially planar surface at substantially oval shaped respective first and second borders, each border includes a shorter minor axis orthogonal to a longer major axis, and the longer major axes of the first and second borders define an angle δ therebetween greater than about 2 degrees or in any of the ranges described elsewhere herein. As another example, as described further elsewhere herein (see, e.g., FIGS. 11A-11B), in some embodiments, the reflecting side 32 includes a plurality of light redirecting surfaces, each light redirecting surface has an axis of revolution and configured to receive an input central light ray emitted by an optical waveguide received and aligned in a corresponding waveguide attachment feature along an incident direction, the incident direction and the axis of revolution define an incident plane corresponding to the light redirecting surface, and the incident planes corresponding to at least two different light redirecting surfaces define an angle ω therebetween greater than about 2 degrees or in any of the ranges described elsewhere herein. As another example, as described further elsewhere herein (see, e.g., FIGS. 12A-12B), in some embodiments, the reflecting side 32 includes a plurality of light redirecting surfaces, each light redirecting surface is configured to receive an input central light ray emitted by an optical waveguide received and aligned in a corresponding waveguide attachment feature along an incident direction intersecting the light redirecting surface at an incident location, the light redirecting surface defines a first principal direction at the incident location corresponding to a direction along which the light redirecting surface has a minimum curvature (i.e., maximum radius of curvature), the incident and first principal directions define a first plane, and the first planes corresponding to at least two different light redirecting surfaces defining an angle $\Omega$ therebetween greater than about 2 degrees or in any of the ranges described elsewhere herein.

The optical waveguides can be any suitable type of waveguides. For example, an optical waveguide may be a channel waveguide or an optical fiber. An optical fiber can be a single mode optical fiber or a multimode optical fiber. The waveguide or optical fiber can have any suitable cross-sectional shape such as circular or polygonal.

The waveguide alignment or attachment features may be any suitable features including grooves such as V-grooves, U-grooves, or Y-grooves. Y-grooves are described in PCT publication Nos. WO 2017/066022 (Haase et al.) and 2017/066018 (Haase et al.). For embodiments of light coupling elements described as including one type of features (e.g., grooves), alternate embodiments may include other types of features (e.g., waveguide attachment features, optical waveguide supports, or optical fiber supports).

Figure 2A:
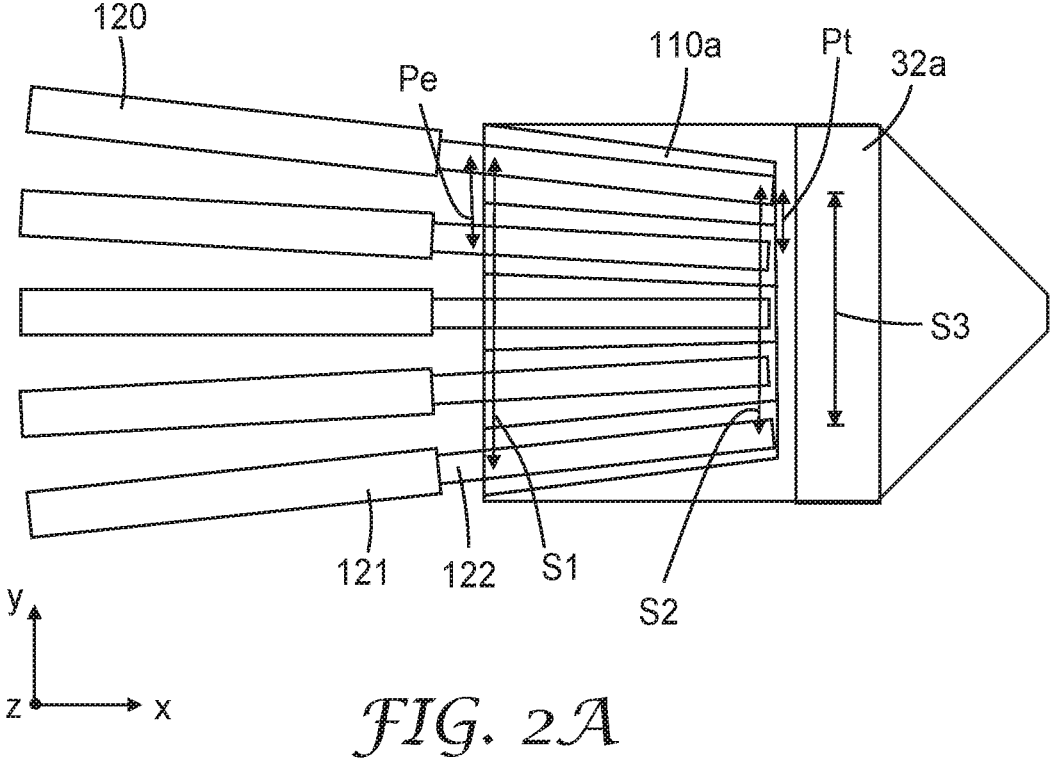
FIGS. 2A-2C are schematic top views of a pluralities of optical waveguides supported on portions of light coupling elements.
Figure 2B:
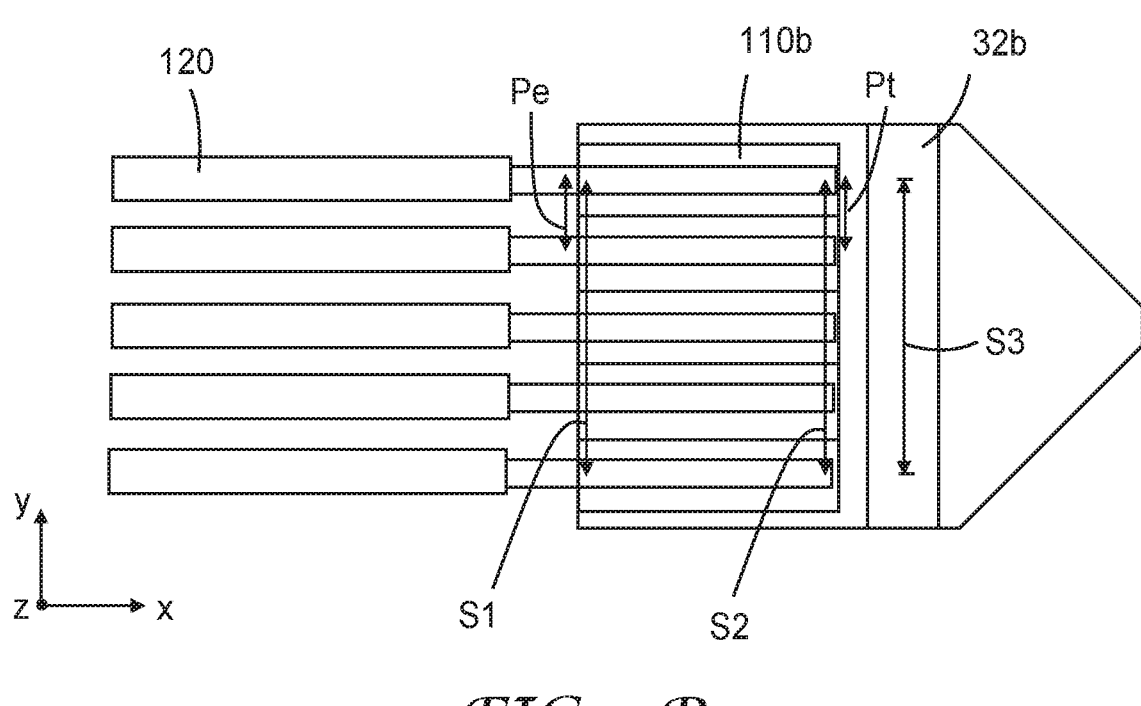
Figure 2C:
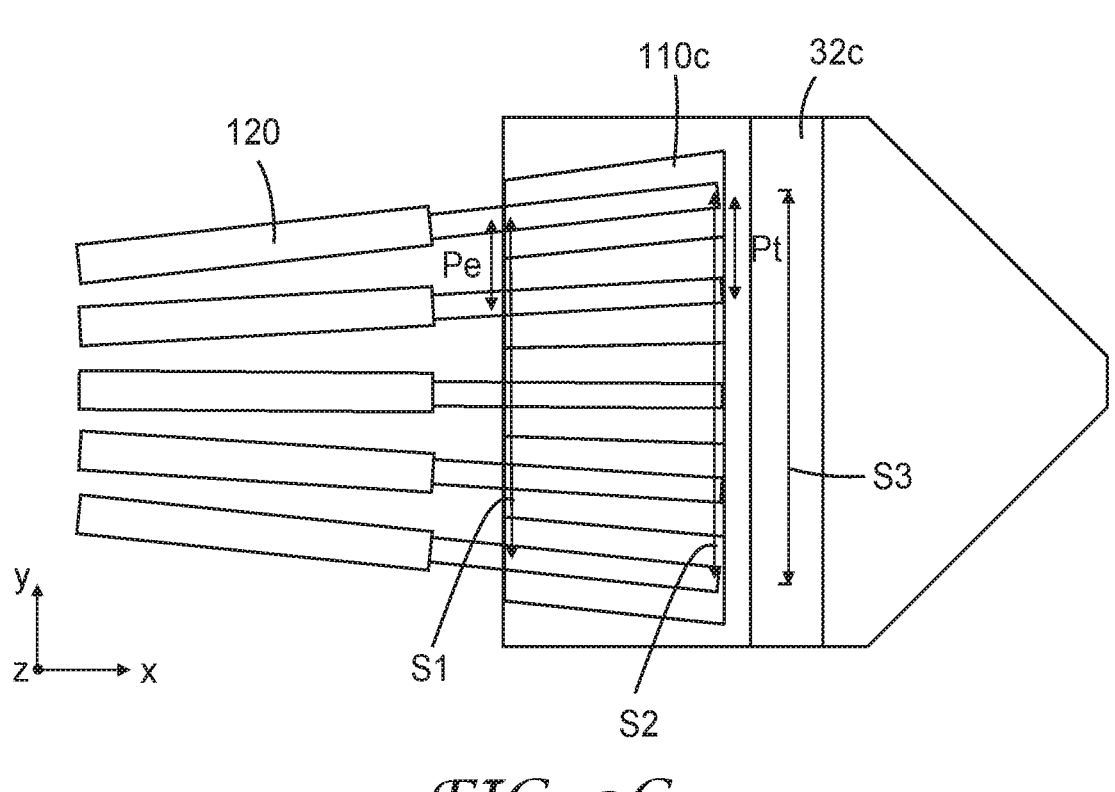

FIGS. 2A-2C are schematic top views of a plurality of optical waveguides 120 (e.g., optical fibers) supported on portions of light coupling elements including a plurality of waveguide supports (e.g., attachment features such as grooves) 110a-110c and reflecting sides 32a-32c. Each optical waveguide 120 has a buffer layer 121 (e.g., a polymer buffer layer) around surrounding a fiber (e.g., a glass fiber) having a cladding 122 (e.g., a glass cladding) around a core (e.g., a glass core). The buffer layer 121 is not present on end portions of the fibers (e.g., the buffer layer 121 may have been mechanically stripped from the end portions) so that the fiber is exposed for attachment to the waveguide supports.

In some embodiments, Pe>Pt. This is schematically illustrated in FIG. 2A where the waveguide supports 110a (e.g., waveguide attachment or alignment features such as grooves) have entrance ends arranged at a pitch Pe and terminal ends arranged at a pitch Pt with Pe greater than Pt. In some embodiments, the light coupling element includes a plurality of curved surface portions disposed to received light from the waveguides 120 and having long axes substantially aligned with the waveguides 120, as described further elsewhere herein. In some such embodiments, or in other embodiments, the light coupling element provides a pitch Px in light exit points substantially equal to Pt (e.g., equal to within 5%, or within 3%, or within 2%). Light coupling elements where Pe>Px (e.g., where Pe>Pt≈Px, or Pe≈Pt>Px, or Pe>Pt>Px) can be used to efficiently couple optical fibers having a larger first pitch to an optical component having optical elements arranged at a smaller second pitch.

In some embodiments, Pt is substantially equal to Pe. This is schematically illustrated in FIG. 2B where the waveguide supports 110b have entrance ends arranged at a pitch Pe and terminal ends arranged at a pitch Pt with Pe substantially equal to Pt (e.g., equal to within 5%, or within 3%, or within 2%, or sufficiently close to equal that a largest angle between the end portions of two different optical waveguides 120 is less than 5 degrees, or less than 3 degrees, or less than 2 degrees). In some embodiments, the light coupling element includes a plurality of curved surface portions disposed to receive light from the waveguides 120 and having long axes rotated to provide a pitch Px in light exit points less than Pt or having centers offset from the centers of the waveguides 120 to provide a pitch Px in light exit points less than Pt so that Pe≈Pt>Px.

In some embodiments, it may be desired to couple optical fibers having a smaller first pitch to an optical component having optical elements arranged at a larger second pitch. In such embodiments, the curved surface portions can be configured to provide a pitch Px in light exit points greater than Pt so that Pe≈Pt<Px.

In some embodiments, Pe<Pt. This is schematically illustrated in FIG. 2C where the waveguide supports 110c have entrance ends arranged at a pitch Pe and terminal ends arranged at a pitch Pt with Pe less than Pt. In some embodiments, the light coupling element includes a plurality of curved surface portions disposed to received light from the waveguides 120 and configured to provide light exit points having a pitch Px substantially equal to Pt. Light coupling elements where Pe<Px (e.g., where Pe<Pt≈Px, or Pe≈Pt<Px, or Pe<Pt<Px) can be used to efficiently couple optical fibers having a smaller first pitch to an optical component having optical elements arranged at a larger second pitch.

In some embodiments, first and second grooves (e.g., the two grooves furthest apart from one another in FIGS. 2A-2C) include respective first and second entrance ends opposite respective first and second terminal ends. A center to center spacing between the first and second entrance ends is S1 and a center to center spacing between the first and second terminal ends is S2. In some embodiments, the reflecting side 32a-32c includes a plurality of light redirecting surfaces (e.g., curved surface portions as described further elsewhere herein). A center to center spacing between positions of first and second light redirecting surfaces corresponding to the first and second grooves is schematically indicated in FIGS. 2A-2C as S3. In some embodiments, S1 is greater than each of S2 and S3. In some embodiments, S3 is greater than each of S1 and S2. In FIG. 2A, S1>S2>S3. In FIG. 2B, S1, S2 and S3 are substantially equal to each other (e.g., equal to within 5%, or within 3%, or within 2%). In FIG. 2C, S1<S2<S3.

Figure 3A:
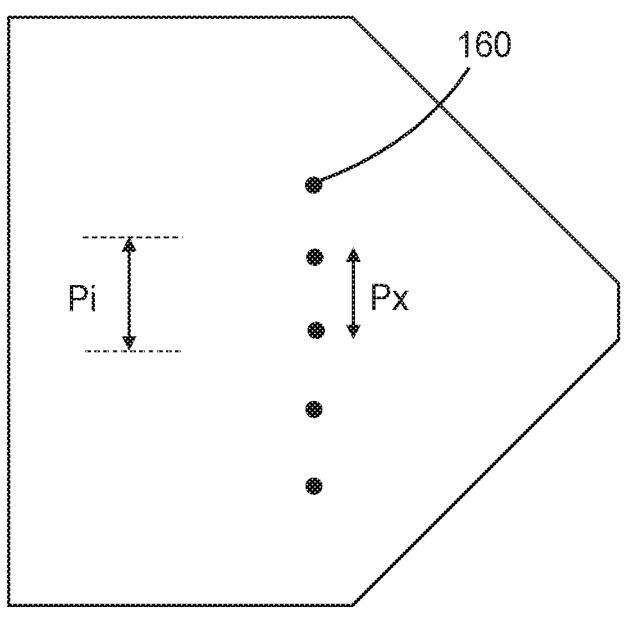
FIGS. 3A-3C are schematic bottom views of light coupling elements illustrating arrangements of exit points.
Figure 3B:
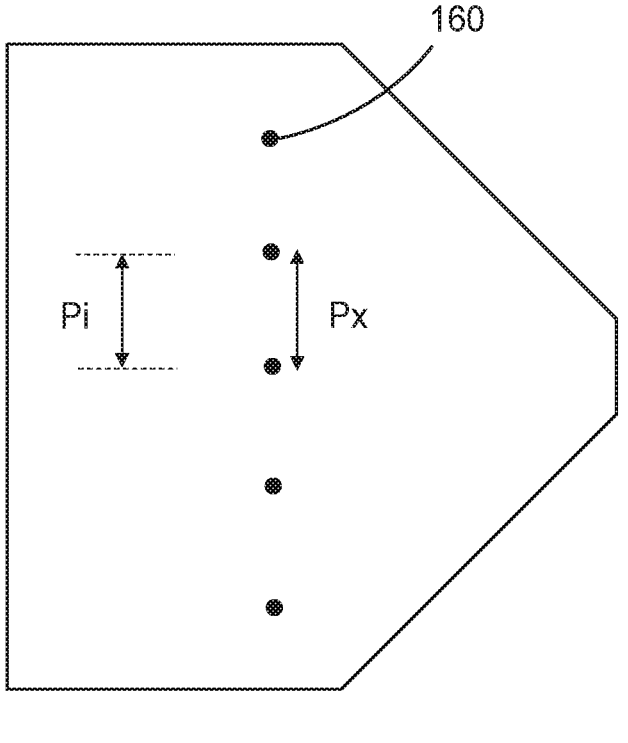
Figure 3C:
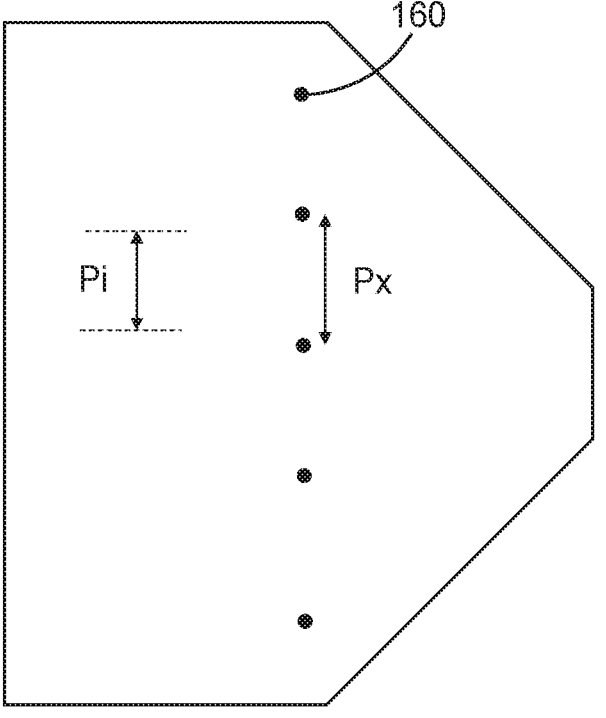

FIGS. 3A-3C are schematic bottom views of light coupling elements schematically illustrating arrangements of exit points 160 and schematically illustrating various possibilities for the pitch Px. For comparison, a pitch Pi which corresponds to Pe or Pt is also illustrated. In FIG. 3A, Pi is greater than Px. In some embodiments, Pi represents Pe, and Px<Pe. In some embodiments, Pi represents Pt, and Px<Pt. In some embodiments, Pe>Pt>Px. In FIG. 3B, Pi is substantially equal to Px. In some embodiments, Pi represents Pt, and Pt is substantially equal to Px. In FIG. 3C, Px is greater than Pi. In some embodiments, Pi represents Pe, and Px is greater than Pe.

In some embodiments, Pe–Px≥5 microns, or Pe–Px≥10 microns, or Pe–Px≥15 microns. In some embodiments, Pe is between about 260 and 270 microns and Px is between about 245 and 255 microns. In some embodiments, Pe is about 265 microns and Px is about 250 microns.

Figure 4:
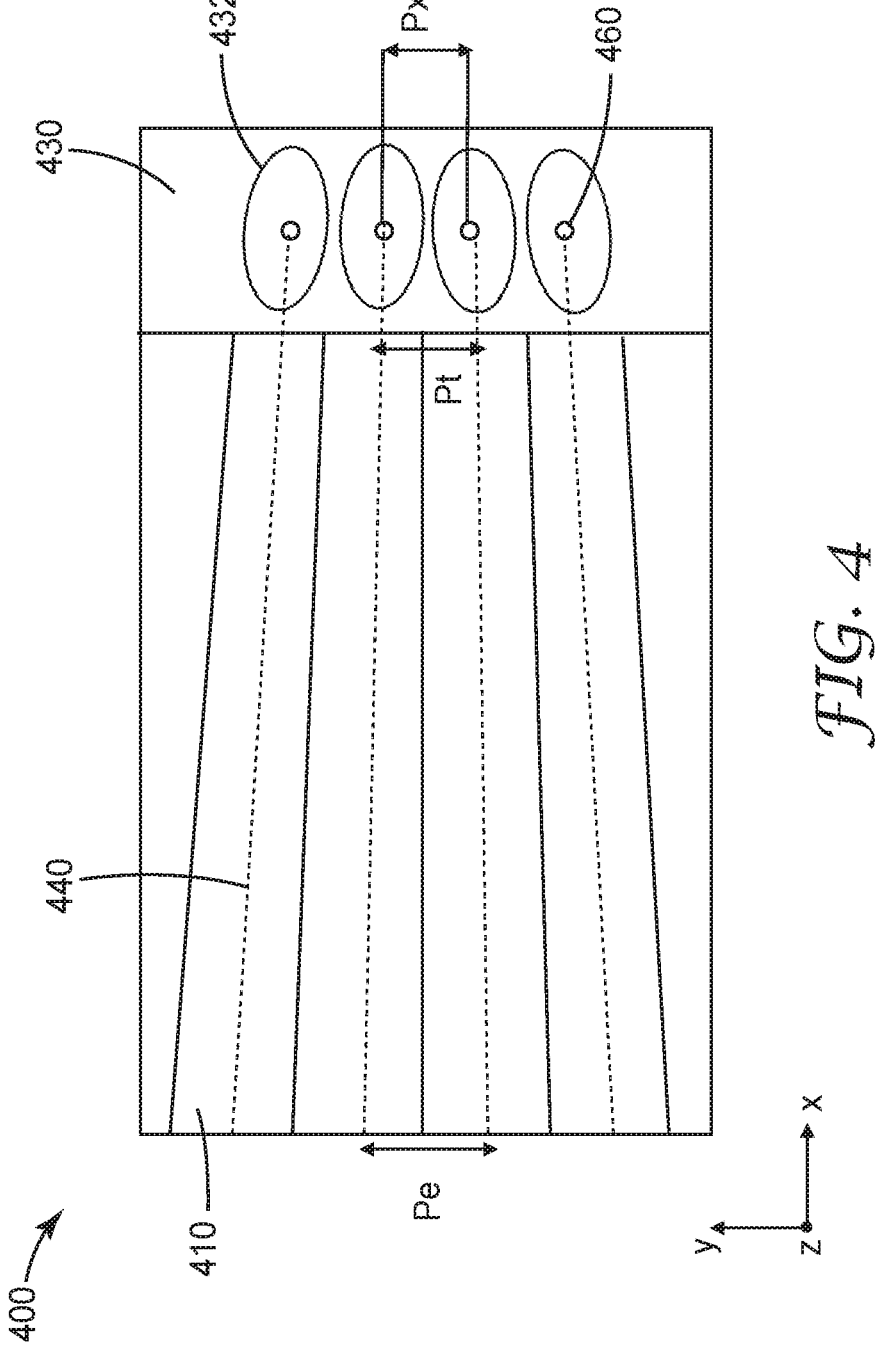
FIG. 4 is a schematic top view of a light coupling element.

FIG. 4 is a schematic top view of a light coupling element 400 including a plurality of optical waveguide supports 410 and a light redirecting member 430 including light redirecting surfaces 432. Centerlines 440 extending along the optical waveguide supports 410 to the corresponding light redirecting surface 432 are schematically illustrated. The optical waveguide supports 410 have entrance ends arranged at a pitch Pe and terminal ends arranged at a pitch Pt. In some embodiments, a central light ray emitted by each optical waveguide received and attached to an optical waveguide support enters the light redirecting member 430 through an input surface as an input central light ray, is redirected by a corresponding light redirecting surfaces 432 into a redirected central light ray and exits the light redirecting member 430 at an exit surface as an output central light ray, where the output central light ray intersects the exit surface at an exit point. The locations of the exit points on the exit surface is schematically illustrated by the circles 460 in FIG. 4. The exits points are arranged at a pitch Px. In the illustrated embodiment, Pe>Pt>Px. Light coupling elements where Pe>Pt>Px can be used to efficiently couple optical fibers having a larger first pitch to an optical component having optical elements arranged at a smaller second pitch.

Figure 5:
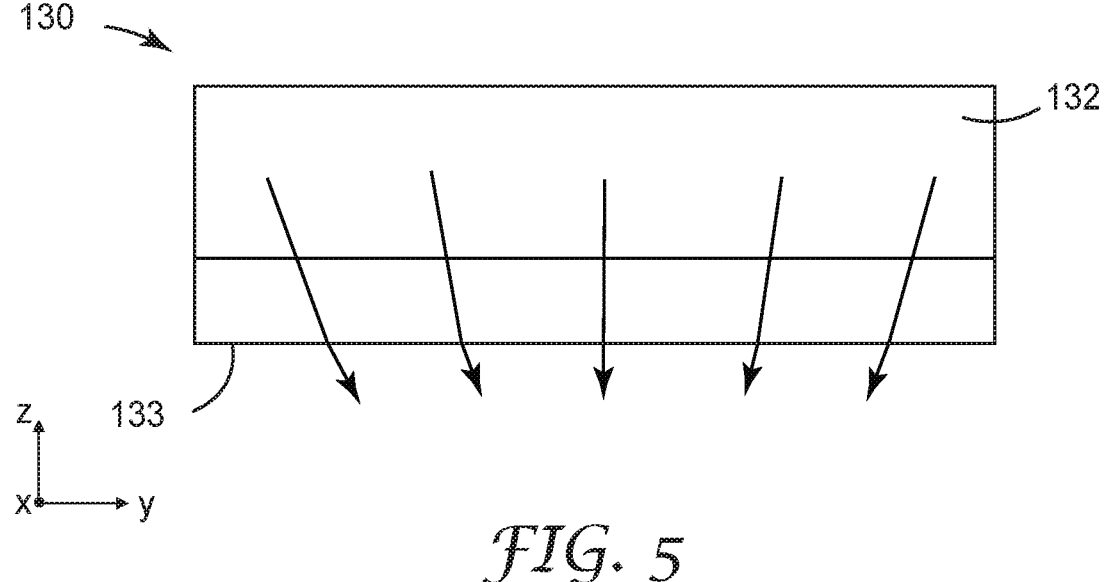
FIG. 5 is a schematic end view of a light coupling element.

In some embodiments, light from different waveguides exits a light coupling element in substantially parallel directions (see, e.g., FIG. 7B). In some embodiments, light from different waveguides exits a light coupling element in non-parallel directions (see, e.g., FIG. 6B). FIG. 5 is a schematic end view of a light coupling element 130 including a light reflecting side 132 and an exit surface 133 which is substantially planar in the illustrated embodiment. The light reflecting side 132 may be a substantially planar surface or may include curved surface portions as described further elsewhere herein. In the illustrated embodiment, the output central light rays 141 are transmitted through the exit surface 133 in non-parallel directions.

Figure 6A:
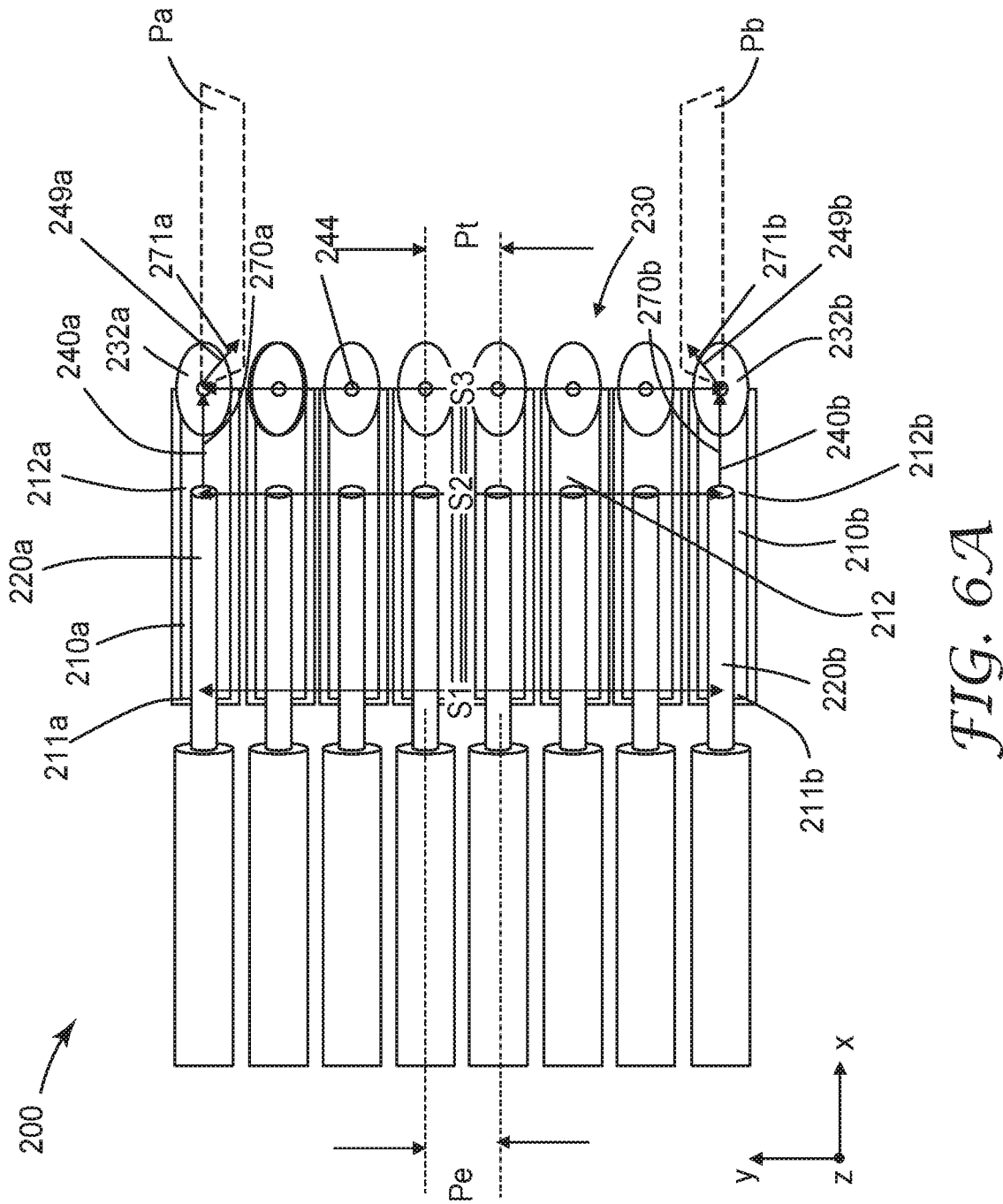
FIGS. 6A-6B are schematic top and end views, respectively, of a light coupling element.
Figure 6B:
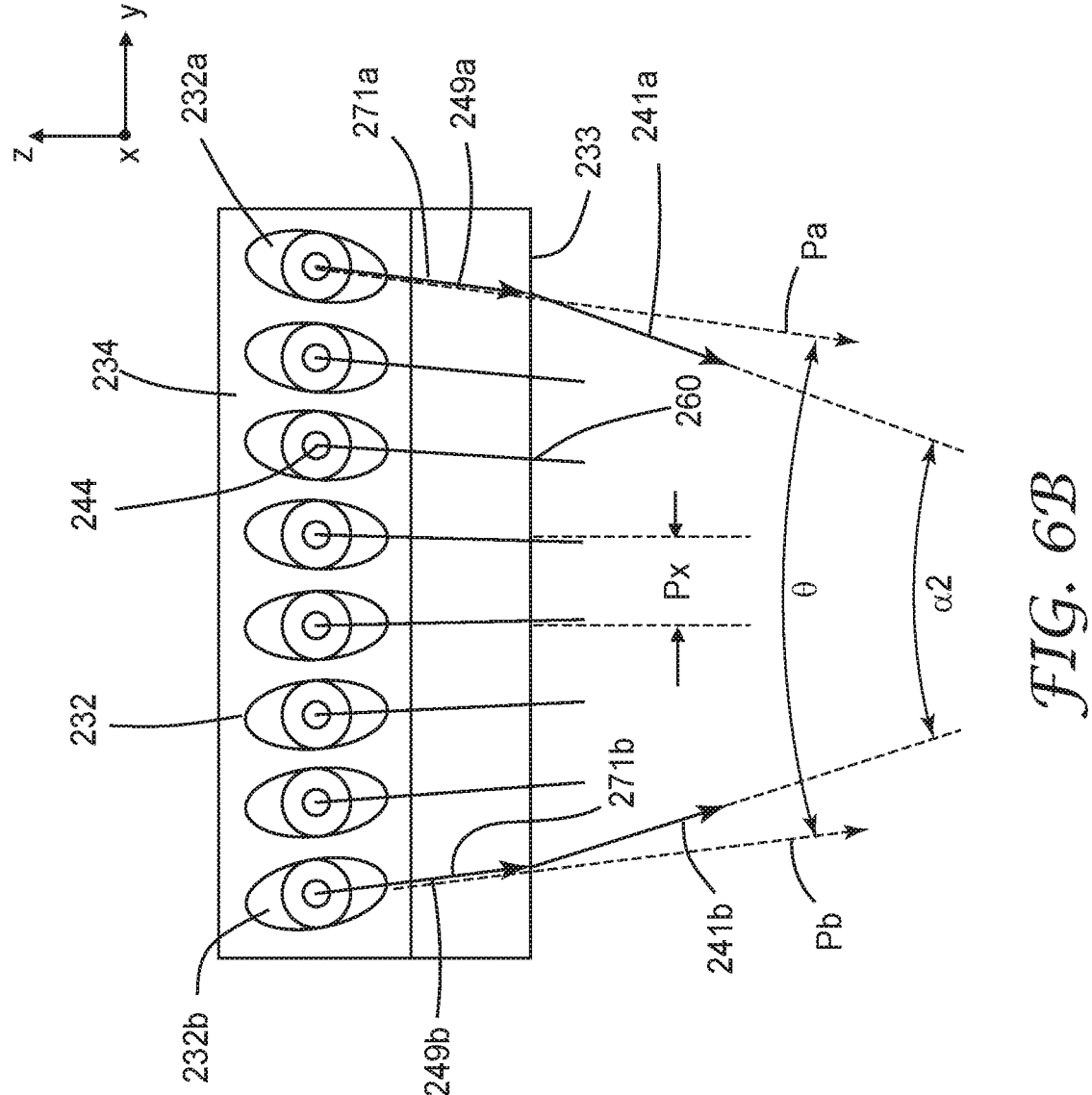
Figure 7A:
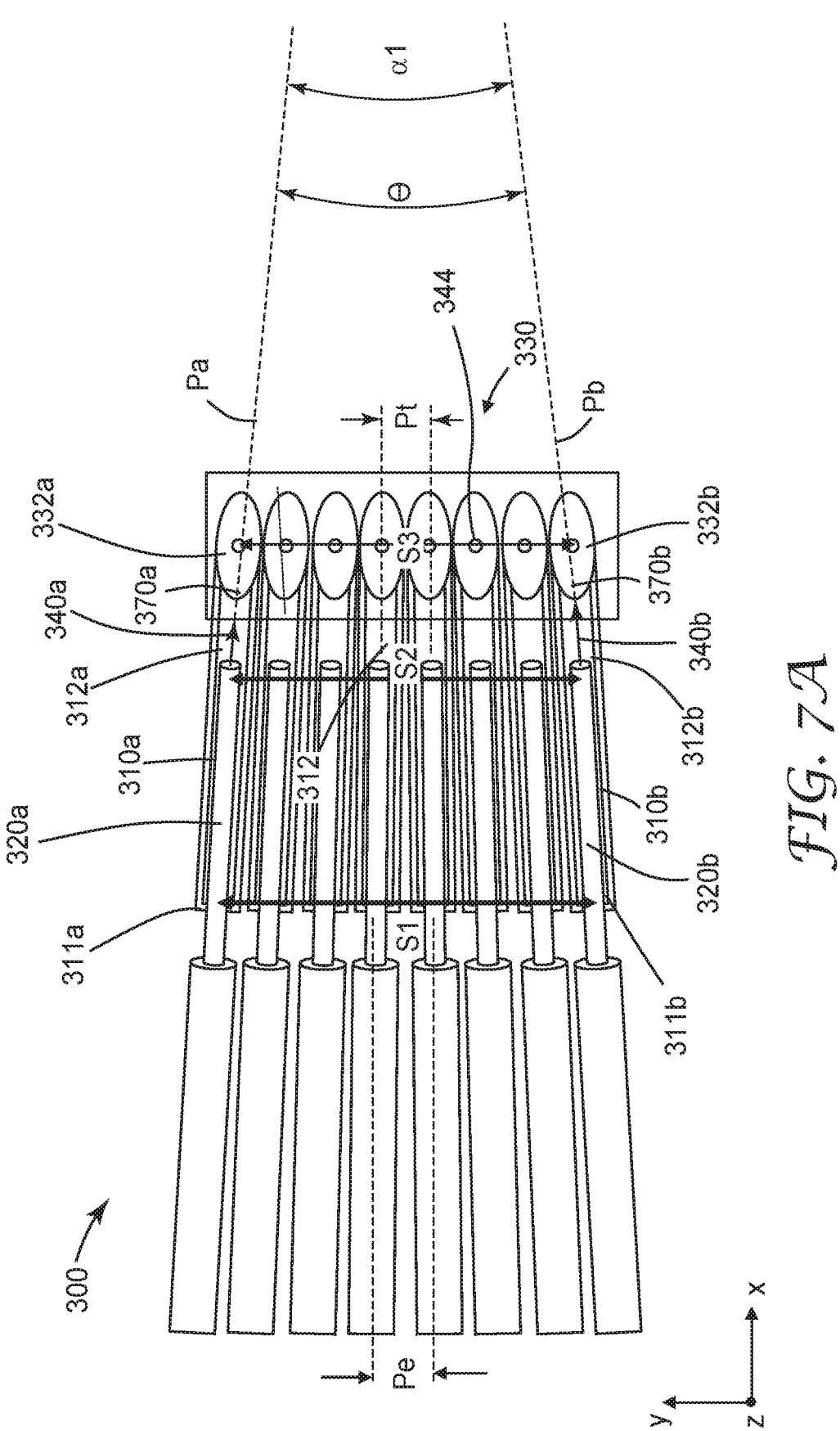

FIGS. 6A-6B are schematic top and end views, respectively, of light coupling element 200, and FIGS. 7A-7B are schematic top and end views, respectively, of light coupling element 300. Elements 212, 230, 232, 233, 260 and elements 312, 330, 332, 333, 360 correspond to elements 12, 30, 32, 33, 60, respectively. The light coupling elements 200 and 300 may each be configured to couple optical fibers having a first pitch to optical elements (e.g., an array of light sources or an array of light detectors) arranged at a different second pitch. In the embodiment illustrated in FIGS. 6A-6B, optical fibers are received in grooves which align the fibers in a substantially same direction, and the light coupling element 200 includes a light redirecting surface having curved surface portions tilted relative to one another to redirect light received from the fibers into desired directions such that the pitch Px of light beams exiting the light coupling element 200 is less than the pitch Pe of the optical fibers. In the embodiment illustrated in FIGS. 7A-7B, optical fibers are received in grooves which align the fibers such that the fibers are spread out at the entrance end of the light coupling element 300, and the light coupling element 300 includes a light redirecting surface having curved surface portions disposed to redirect light received from the waveguides into substantially parallel directions such that the pitch Px of light beams exiting the light coupling element 300 is less than the pitch Pe of the optical fibers at the entrance end of the grooves.

In some embodiments, the light coupling element 200 (resp., 300) includes a light redirecting member 230 (resp., 330) including an input side (corresponding to input surface 31 depicted in FIG. 1A) for receiving light (e.g., central rays 240a and 240b (resp., 340a and 340b)) from an optical waveguide (e.g., waveguides 220a and 220b (resp., 320a and 320b)) received and aligned in a groove (e.g., features 210a and 210b (resp., 310a and 310b)) in a plurality of grooves; and a light redirecting surface (e.g., light redirecting surfaces 232a and 232b (resp., 332a and 332b)), such that when an optical waveguide (e.g., waveguides 220a and 220b (resp., 320a and 320b)) received and aligned in a groove emits an input central light ray (e.g., central rays 240a and 240b (resp., 340a and 340b)), the input central light ray is received by the light redirecting surface from the input side along an incident direction (e.g., incident directions 270a and 270b (resp., 370a and 370b)) and the light redirecting surface changes the direction of the received light to a different redirected direction (e.g., redirected directions 271a and 271b (resp., 371a and 371b)). The incident direction intersects the light redirecting surface at an incident location 244 (resp., 344). The incident and redirected directions define a propagation plane (e.g., Pa, Pb) corresponding to the groove.

In some embodiments, the propagation planes Pa and Pb corresponding to at least two different grooves (e.g., 210a and 210b or 310a and 310b) define an angle θ therebetween (see, e.g., FIGS. 6B, 6C, 7A, and 7C). The two different grooves may be taken to be any two different grooves in the light coupling element. For example, the two different grooves may be taken to be the two grooves in the light coupling element having a largest separation from one another. Similarly, when properties relating to two different features (e.g., supports, grooves, surface portions, light redirecting surfaces) or relating to first and second features are described, the features can be any of two different features such as corresponding features having a largest separation from one another. In some embodiments, the angle θ is greater than about 2 degrees, or greater than about 3 degrees, or greater than about 4 degrees, or greater than about 5 degrees, or greater than about 6 degrees, or greater than about 7 degrees, or greater than about 8 degrees, or greater than about 10 degrees, or greater than about 15 degrees, or greater than about 20 degrees. In some embodiments, the angle θ is no more than about 30 degrees.

Figure 6C:
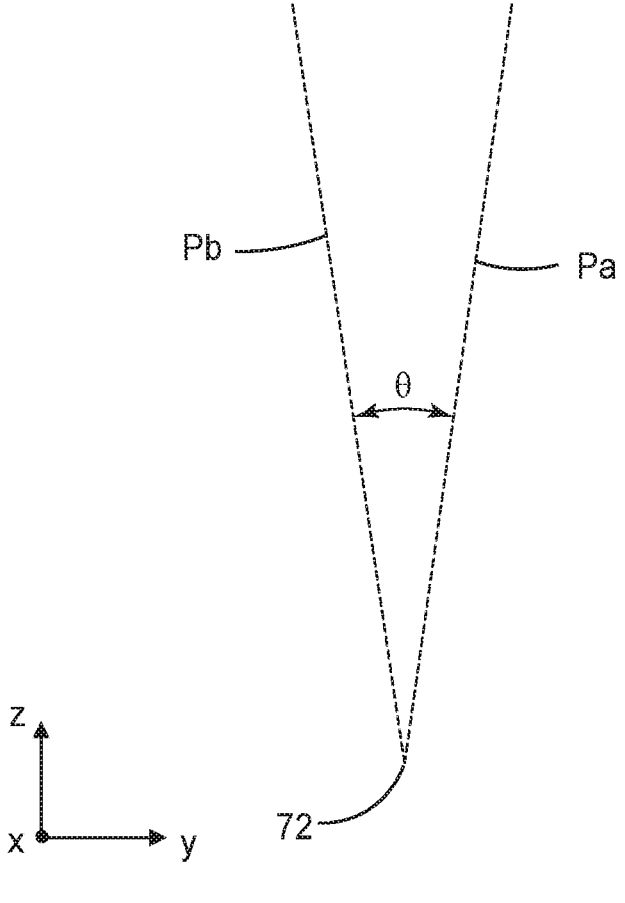
FIG. 6C is a schematic illustration of intersecting propagation planes of the light coupling element of FIGS. 6A-6B.

In some embodiments of the light coupling element 200, the propagation planes Pa and Pb intersect each other at an intersection axis 72 that is substantially parallel to the first direction (x-direction) as schematically illustrated in FIG. 6C. In some embodiments of the light coupling element 300, the propagation planes Pa and Pb intersect each other at an intersection axis 73 that is substantially perpendicular to the first and second directions (x- and y-directions) as schematically illustrated in FIG. 7C.

In some embodiments, the first and second input central rays define an angle α1 therebetween. For example, the first and second input central rays 340a and 340b define an angle α1 therebetween (see FIG. 7A). The first and second input central rays may be converging or diverging or may be substantially parallel (e.g., the first and second input central rays 240a and 240b define an angle therebetween that is about zero degrees). In some embodiments, the first and second output central rays define an angle α2 therebetween. For example, the first and second output central rays 241a and 241b define an angle α2 therebetween (see FIG. 6B). The first and second output central rays may be converging or diverging or substantially parallel (e.g., the first and second input central rays 340a and 340b define an angle therebetween that is about zero degrees).

The angle α1 is between the input central rays 240a and 240b (resp., 340a and 340b) just after the rays enter the light coupling element and the angle α2 is between the first and second output central rays 241a and 241b (resp., 341a and 341b) just after the rays have exited the light coupling element. The angle between the light rays inside the light coupling element that exit the light coupling element as the first and second output central rays may be different than the angle α2 between the first and second output central rays. For example, the angle α2 between first and second output central rays may be approximately zero and the angle between corresponding redirected central rays inside the light coupling element that exit as the first and second output central rays may be different from zero. In some embodiments, e.g., in some embodiments of light coupling element 300), the angle α1 is greater than about 2 degrees and the angle α2 is less than about 1 degree. In some such embodiments, the angle α1 is greater than about 3, 4, 5, 6, 7, 8, 10, 15, or 20 degrees. In some such embodiments, the angle $\alpha 1$ is no more than about 30 degrees. In some embodiments (e.g., in some embodiments of light coupling element 200), the angle $\alpha 1$ is less than about 1 degree and the angle $\alpha 2$ is greater than about 1 degree. In some such embodiments, the angle $\alpha 2$ is greater than about 3, 4, 5, 6, 7, 8, 10, 15, or 20 degrees. In some such embodiments, the angle $\alpha 2$ is no more than about 30 degrees.

Figure 6D:
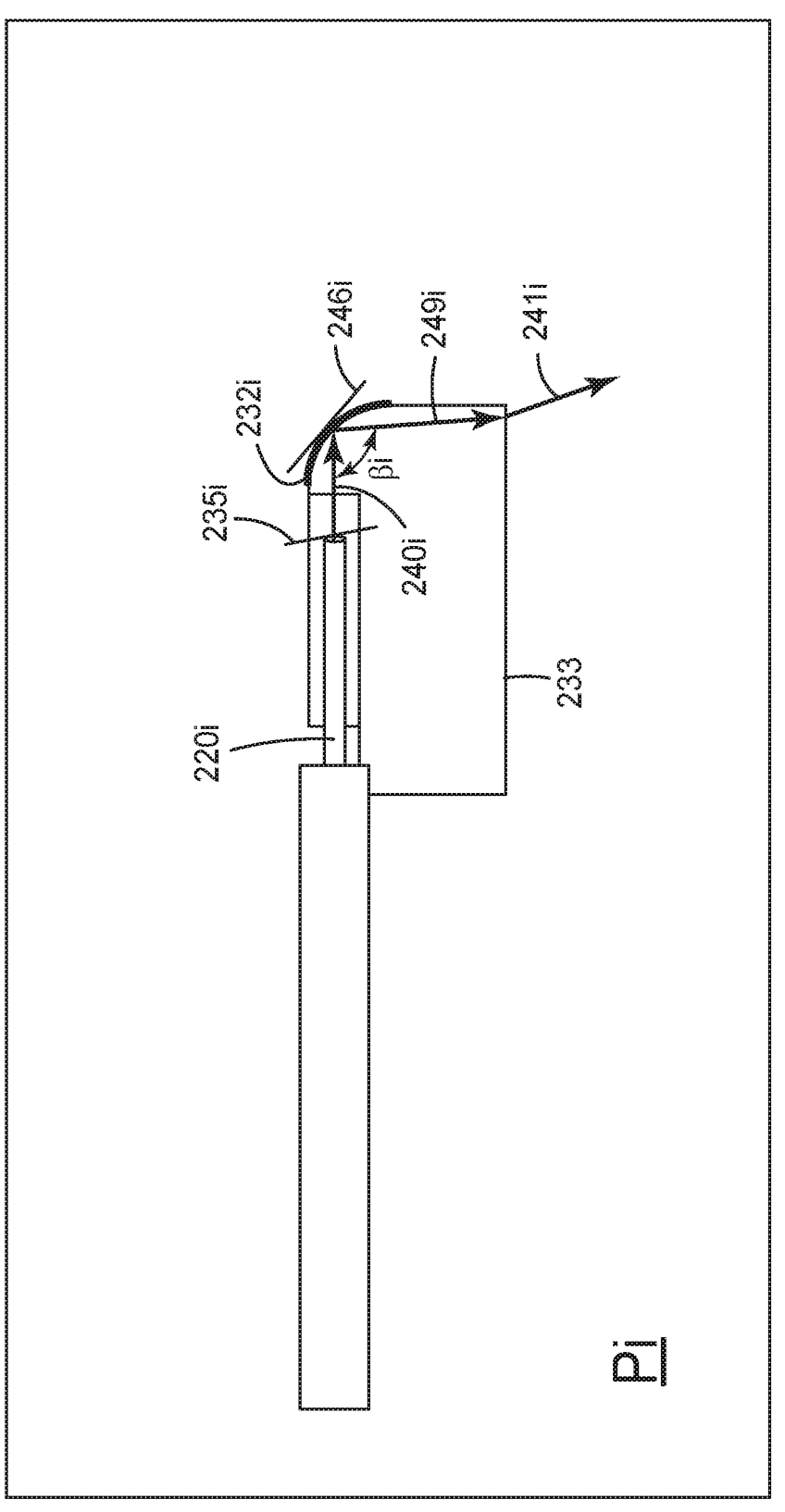
FIG. 6D is a schematic cross-sectional view of a light coupling element in a propagation plane.

FIG. 6D is a cross-section though an i-th waveguide 220$i$ in a propagation plane Pi defined by the i-th input central light ray 240$i$ and the i-th redirected central light ray 249$i$ according to some embodiments of light coupling element 200. The i-th input and redirected central light rays 240$i$ and 249$i$ define an angle $\beta i$ therebetween. The projection of the i-th output central ray 241$i$ in the propagation plane is also schematically illustrated in FIG. 6D. The output central ray 241$i$ propagates in a different direction than the redirected central light ray 249$i$ due to refraction at the exit surface 233. The i-th light redirecting surface 232$i$ is also schematically illustrated in FIG. 6D. In some embodiments of the light coupling element 200 or in other embodiments, the i-th light redirecting surface 232$i$ has an axis of revolution 235$i$. The projection of the axis of revolution 235$i$ onto the propagation plane Pi is schematically illustrated in FIG. 6D. In some embodiments of the light coupling element 200 or in other embodiments, the i-th light redirecting surface 232$i$ defines a first principal direction 246$i$ at the incident location of the input central light ray 240$i$ corresponding to a direction along which the light redirecting surface 232$i$ has a minimum curvature (maximum radius of curvature), as described further elsewhere herein. The projection of the first principal direction 246$i$ onto the propagation plane Pi is schematically illustrated in FIG. 6D.

In some embodiments, first input and redirected central light rays (e.g., central rays 240$a$ and 249$a$ or central rays 340$a$ and 349$a$) define an angle $\beta 1$ therebetween (see, e.g., FIG. 6D for i=1). Similarly, in some embodiments, second input and redirected central light rays (e.g., central rays 240$b$ and 249$b$ or central rays 340$b$ and 349$b$) define an angle $\beta 2$ therebetween (see, e.g., FIG. 6D for i=2). In some embodiments (e.g., in some embodiments of light coupling elements 200 or 300), the angle $\beta 1$ is greater than about 30 degrees and the angle $\beta 2$ is greater than about 30 degrees. In some embodiments, the angles $\beta 1$ and $\beta 2$ are independently in a range from about 30 degrees to about 150 degrees, or from about 50 degrees to about 130 degrees, or from about 60 degrees to about 120 degrees, or from about 70 degrees to about 110 degrees, or from about 80 degrees to about 100 degrees. In preferred embodiments, the angles $\beta 1$ and $\beta 2$ are about equal. In some embodiments, the angles $\beta 1$ and $\beta 2$ are each about 90 degrees.

In some embodiments, first and second grooves (e.g., features 210$a$ and 210$b$ (resp., 310$a$ and 310$b$)) include respective first and second entrance ends (e.g., entrance ends 211$a$ and 211$b$ (resp., 311$a$ and 311$b$)) opposite respective first and second terminal ends (e.g., terminal ends 212$a$ and 212$b$ (resp., 312$a$ and 312$b$)). A center to center spacing between the first and second entrance ends is S1, a center to center spacing between the first and second terminal ends is S2, and a center to center spacing between the first and second light redirecting surfaces is S3. For light coupling element 200, S1, S2 and S3 are substantially equal to each other (e.g., equal to within 5%, or within 3%, or within 2%). For light coupling element 300, S1 is greater than each of S2 and S3. In other embodiments, S3 is greater than each of S1 and S2 (see, e.g., FIG. 2C). The entrance ends of the supports or grooves are arranged at a pitch Pe and the terminal ends of the supports or grooves are arranged at a pitch Pt. In the illustrated embodiment of the light coupling element 200, Pt is substantially equal to Pe. In the illustrated embodiment of the light coupling element 300, Pe is greater than Pt.

In some embodiments of the light coupling element 200 (resp., 300), when first and second optical waveguides 220$a$ and 220$b$ (resp., 320$a$ and 320$b$) are received and aligned in respective first and second grooves 210$a$ and 210$b$ (resp., 310$a$ and 310$b$) and emit respective first and second input central light rays 240$a$ and 240$b$ (resp., 340$a$ and 340$b$), the first and second light redirecting surfaces 232$a$ and 232$b$ (resp., 332$a$ and 332$b$) receive and reflect the input central light rays into respective first and second redirected central light rays so that the redirected central light rays exit the light coupling element 200 (resp., 300) as respective first and second output central light rays 241$a$ and 241$b$ (resp., 341$a$ and 341$b$). For each of the light coupling elements 200 and 300, the output central light rays intersect the exit surface at exit points arranged at a pitch Px less than Pe.

The light redirecting surface 232 (resp., 332) includes first and second curved surface portions 232$a$ and 232$b$ (resp., 332$a$ and 332$b$) projecting from a substantially planar surface 234 (resp., 334) which are configured to change direction of light received from optical fibers supported by first and second optical fiber supports. This is further illustrated in FIG. 8 which is a schematic side view of a portion of the light redirecting member 530, which may correspond to light redirecting member 230 or 330, for example. FIG. 8 schematically illustrates a curved surface portion 532$b$ projecting from a substantially planar surface 534. The curved surface portions may be described as mirrors, reflectors, or reflective surfaces, for example.

Figure 9:
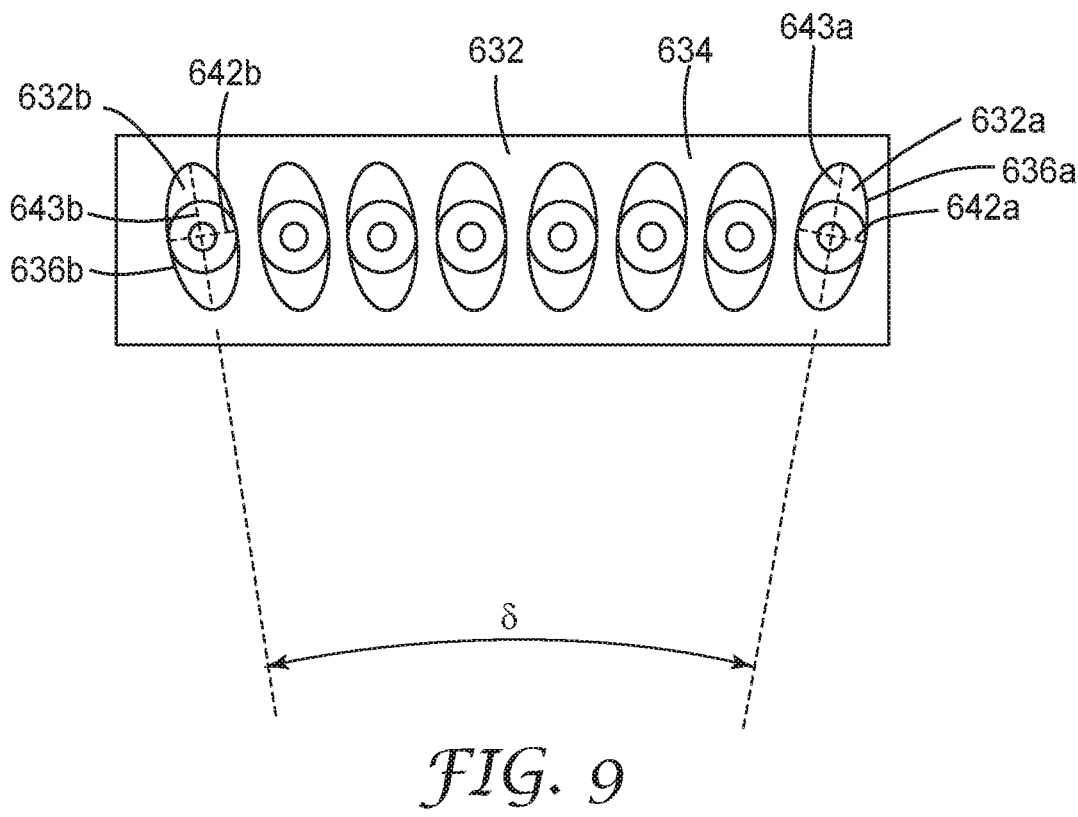
FIG. 9 is a schematic illustration of a light redirecting surface.

FIG. 9 is a schematic illustration of a light redirecting surface 632, which may correspond to light redirecting surface 232 or 332, for example, and which includes a plurality of curved surface portions, including first and second curved surface portions 632$a$ and 632$b$, projecting from a substantially planar surface 634. FIG. 9 is a schematic view of the light redirecting surface 632 along a direction substantially normal to the substantially planar surface 634. In some embodiments, the first and second curved surface portions 632$a$ and 632$b$ intersect the substantially planar surface 634 at substantially oval shaped (e.g., elliptical or approximately elliptical) respective first and second borders 636$a$ and 636$b$, where each border includes a shorter minor axis 642$a$ or 642$b$ orthogonal to a longer major axis 643$a$ or 643$b$.

The longer major axes of different curved surface portions may be rotated relative to one another. For example, in the embodiment illustrated in FIGS. 6A-6B, the curved surface portions may be rotated about the x-axis to turn the reflected light into desired redirected directions. As another example, in the embodiment illustrated in FIGS. 7A-7B, the curved surface portions may be rotated about the z-axis to align the major axis with the waveguides. In some embodiments, the longer major axes 643$a$ and 643$b$ of the first and second borders defines an angle $\delta$ therebetween as schematically illustrated in FIG. 9. In some embodiments, the angle $\delta$ is greater than about 2 degrees, or greater than about 3 degrees, or greater than about 4 degrees, or greater than about 5 degrees, or greater than about 6 degrees, or greater than about 7 degrees, or greater than about 8 degrees, or greater than about 10 degrees, or greater than about 15 degrees, or greater than about 20 degrees. In some embodiments, the angle $\delta$ is no more than about 30 degrees.

The shape and orientation of the curved surface portions may be chosen so that the light output of the light redirecting member propagates in desired directions. The curvature of the curved surface portions can be selected to provide a desired change in a divergence of the received light (e.g., for focusing or collimating the redirected light). In some embodiments, instead of, or in addition to, rotating the curved surface portions to adjust the light output direction, the curved surface portions are arranged at a different pitch than the optical waveguides to provide an offset relative to the waveguides.

Figure 10:
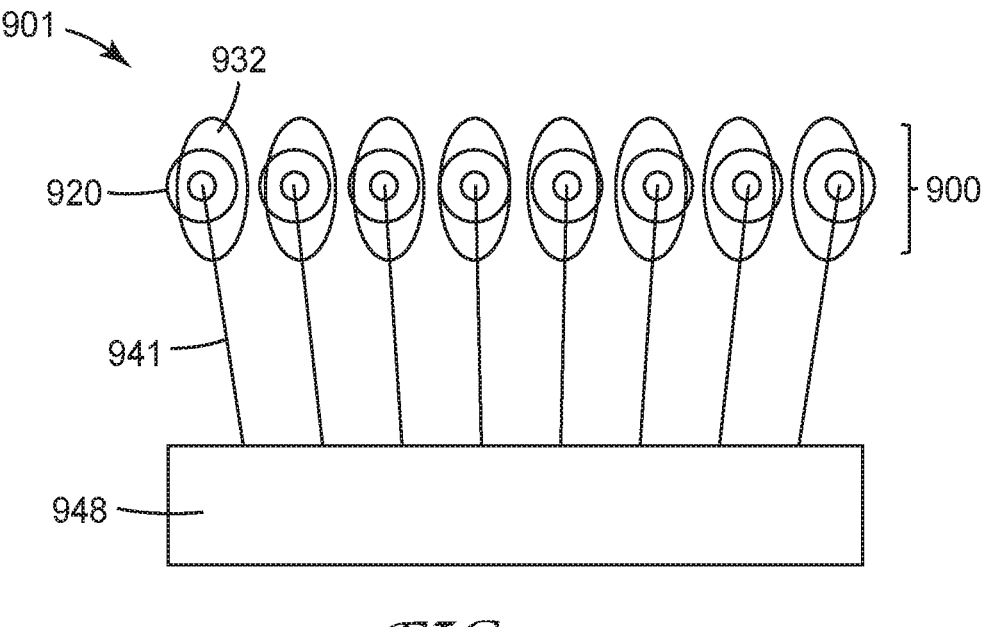
FIG. 10 is a schematic end view of an optical assembly.

FIG. 10 is a schematic end view of an optical assembly 901 including a light coupling element 900 optically coupling a plurality of optical waveguides 920, which are optical fibers in the illustrated embodiment, to an optical component 948 which may include an array of light sources or an array of light detectors arranged at a pitch smaller than a pitch of the optical waveguides 920. The light coupling element 900 includes curved surface portions 932 arranged at a pitch less than a pitch of the optical waveguides 920. Light 941 may be transmitted from the optical waveguides 920 to the optical component 948 or from the optical component 948 to the optical waveguides 920.

In some embodiments, a light coupling element is adapted to mate with a mating light coupling element. For example, a light coupling element and a mating light coupling element may be used to connect ribbon cables together. The light coupling element may include various features, such as mating tongue, to facilitate the mating of the light coupling element to a mating light coupling element, for example. Useful features for optical connectors are described in U.S. Pat. No. 9,482,827 (Haase et al.), for example.

In some embodiments, each of the light redirecting surfaces (e.g., the curved surface portions of the light redirecting surface) of the light coupling element 200 or 300 has an axis of revolution. For example, the shapes of the curved surface portions are, in some embodiments, surfaces of revolution defined by revolving a curve (e.g., a parabola or a circular arc) about an axis.

Figure 11A:
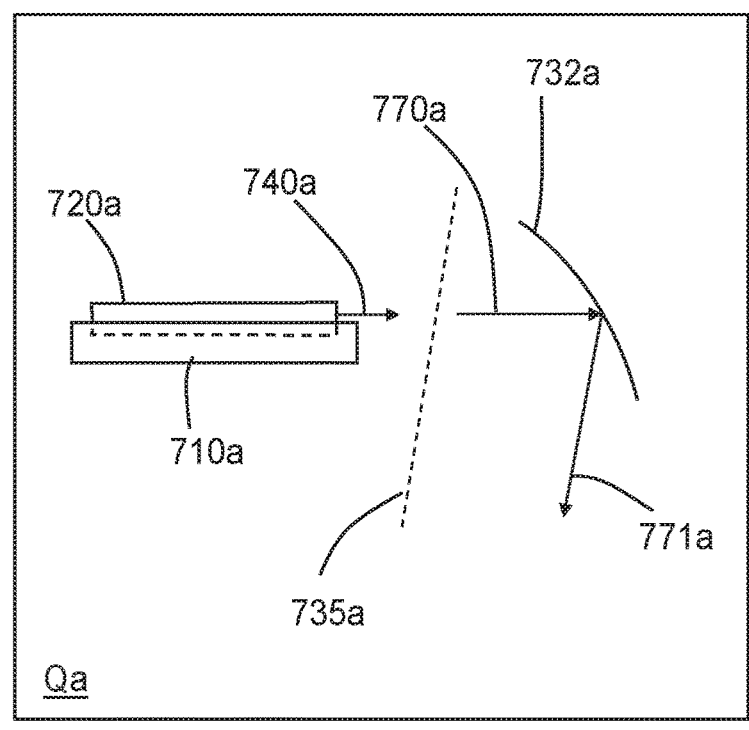
FIG. 11A is a schematic cross-sectional view of a light redirecting surface having an axis of revolution.
Figure 11B:
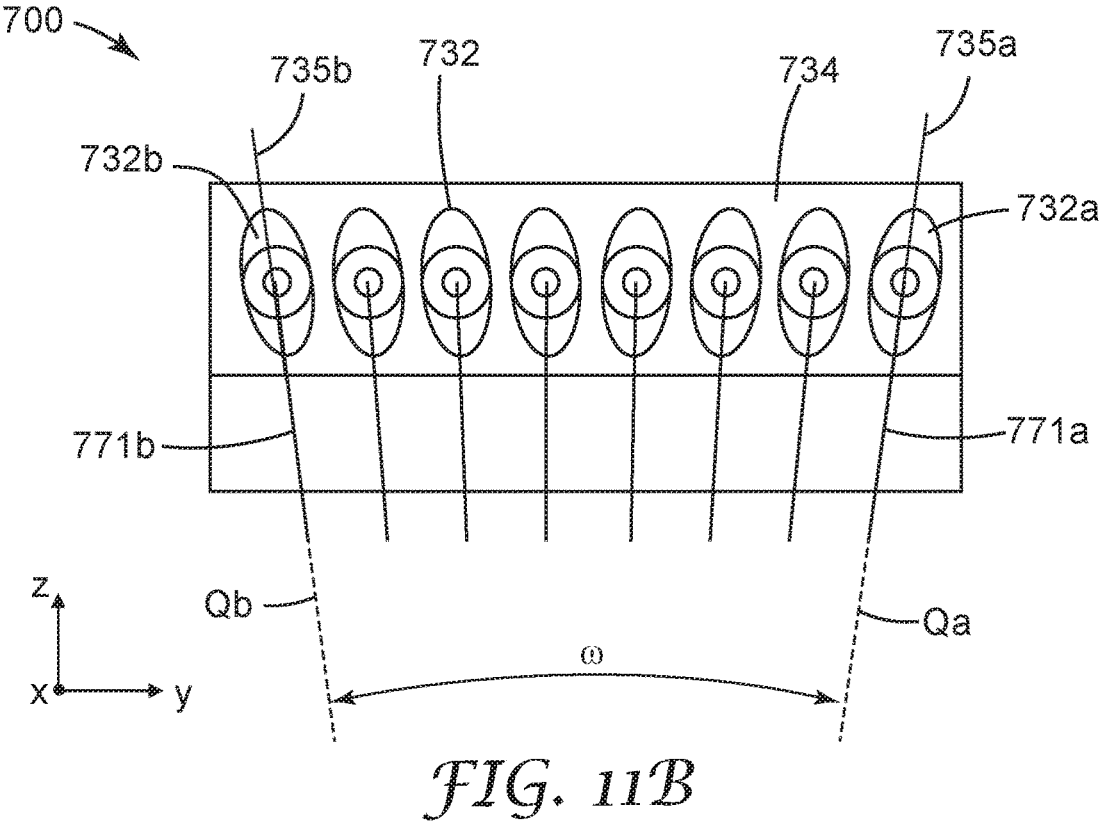
FIG. 11B is a schematic end view of a light coupling element including the light redirecting surface of FIG. 11A.

FIG. 11A is a schematic illustration of a light redirecting surface 732a (e.g., corresponding to light redirecting surface portions 232a of redirecting surface 232 or to light redirecting surface portion 332a of redirecting surface 332) disposed to receive light from optical waveguide 720a. FIG. 11B is an end view of a light coupling element 700 including a plurality of light redirecting surfaces which include the light redirecting surfaces 732a and 732b. In the illustrated embodiment, the light redirecting surfaces 732a and 732b are the two light redirecting surfaces farthest apart from one another. In other embodiments, the first and second light redirecting surfaces may be any two different light redirecting surfaces of a light coupling element. In the illustrated embodiment, the light coupling element 700 includes light redirecting surface 732 which includes the first and second light redirecting surfaces 732a and 732b projecting from a substantially planar surface 734. The light redirecting surfaces 732a and 732b redirect central light rays received from a corresponding optical waveguide along respective redirected directions 771a and 771b. Each light redirecting surface (e.g., light redirecting surface 732a or 732b) has an axis of revolution (e.g., axis of revolution 735a or 735b) and is configured to receive an input central light ray (e.g., central ray 740a) emitted by an optical waveguide (e.g., optical waveguide 720a) received and aligned in a corresponding optical waveguide support (e.g., optical waveguide support 710a) along an incident direction (e.g., incident direction 770a). The incident direction and the axis of revolution define an incident plane (e.g., incident plane Qa) corresponding to the light redirecting surface (e.g., light redirecting surface 732a). The incident planes (e.g., Qa and Qb) corresponding to at least two different light redirecting surfaces (e.g., 732a and 732b) define an angle co therebetween as schematically illustrated in FIG. 11B. In some embodiments, the angle $\omega$ is greater than about 2 degrees, or greater than about 3 degrees, or greater than about 4 degrees, or greater than about 5 degrees, or greater than about 6 degrees, or greater than about 7 degrees, or greater than about 8 degrees, or greater than about 10 degrees, or greater than about 15 degrees, or greater than about 20 degrees. In some embodiments, the angle $\omega$ is no more than about 30 degrees.

At any given point on a curved surface, curvature can be determined for a curve defined by the intersection of the surface with a plane containing the normal to the curved surface at the point. This curvature in general depends on the orientation of the plane defining the curve. The maximum and minimum curvatures (corresponding to the minimum and maximum radii of curvature, respectively) are known as principal curvatures and the corresponding planes are known as principal planes. The directions tangent to the surface in the principal planes are known as principal directions. In some embodiments, each of the light redirecting surfaces (e.g., the curved surface portions of the light redirecting surface) have a substantially oval shaped border with a long axis along a principal direction at the incident location corresponding to a direction along which the light redirecting surface has a minimum curvature. For example, in some embodiments, the longer major axes 643a and 643b are along a direction of a minimum curvature of the light redirecting surfaces 632a and 632b.

Figure 12A:
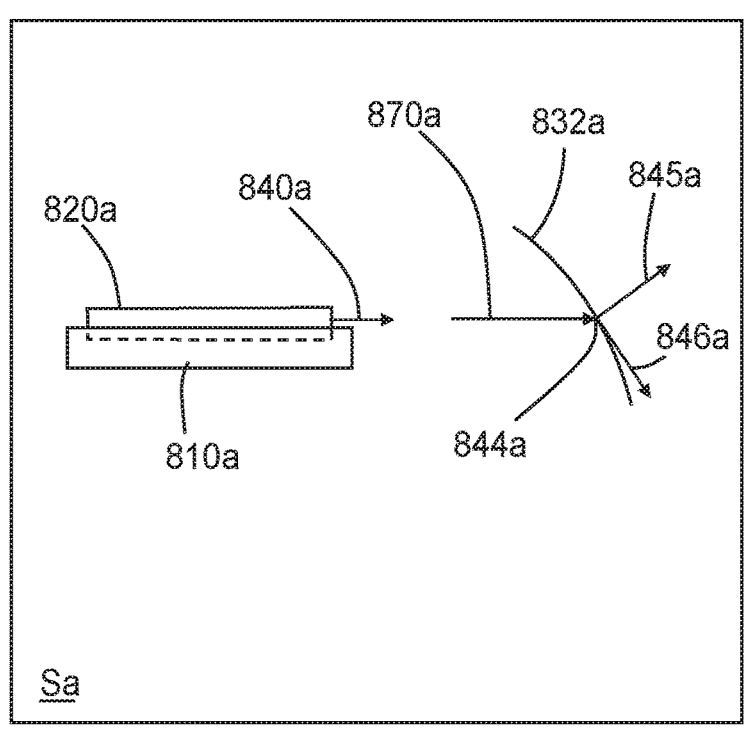
FIG. 12A is a schematic cross-section view of a light redirecting surface.
Figure 12B:
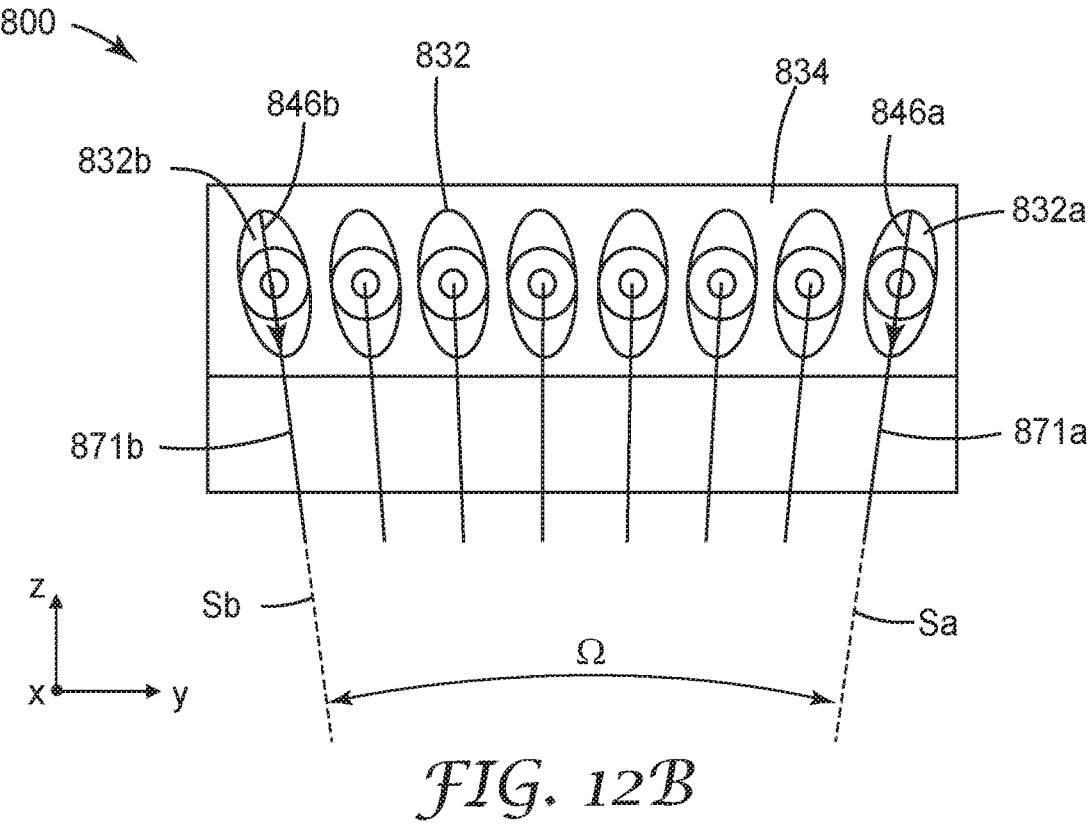
FIG. 12B is a schematic end view of a light coupling element including the light redirecting surface of FIG. 12A.

FIG. 12A is a schematic illustration of light redirecting surface 832a (e.g., corresponding to light redirecting surface portion 232a or light redirecting surface portion 332a) disposed to receive light from optical waveguide 820a. FIG. 12B is an end view of a light coupling element 800 including a plurality of light redirecting surfaces which include the light redirecting surfaces 832a and 832b. In the illustrated embodiment, the light redirecting surfaces 832a and 832b are the two light redirecting surfaces farthest apart from one another. In other embodiments, the first and second light redirecting surfaces may be any two different light redirecting surfaces of a light coupling element. In the illustrated embodiment, the light coupling element 800 includes light redirecting surface 832 which includes the first and second light redirecting surfaces 832a and 832b projecting from a substantially planar surface 834. The light redirecting surfaces 832a and 832b redirect central light rays received from a corresponding optical waveguide along respective redirected directions 871a and 871b. Each light redirecting surface (e.g., light redirecting surface 832a) is configured to receive an input central light ray (e.g., central ray 840a) emitted by an optical waveguide (e.g., optical waveguide 820a) received and aligned in a corresponding optical waveguide support (e.g., optical waveguide support 810a) along an incident direction (e.g., incident direction 870a) intersecting the light redirecting surface at an incident location (e.g., incident location 844a). The light redirecting surface 832a defines a first principal direction 846a at the incident location corresponding to a direction along which the light redirecting surface has a minimum curvature. The normal direction 845a at the incident location 844a is indicated in FIG. 12A. The incident and first principal directions 846a and 846a define a first plane Sa. Similarly, the incident direction and the first principal direction 846b for second light redirecting surface 832*b* defines a first plane Sb. The first planes (e.g., Sa and Sb) corresponding to at least two different light redirecting surfaces (e.g., 832*a* and 832*b*) define an angle $\Omega$ therebetween as schematically illustrated in FIG. 12B. In some embodiments, the angle $\Omega$ is greater than about 2 degrees, or greater than about 3 degrees, or greater than about 4 degrees, or greater than about 5 degrees, or greater than about 6 degrees, or greater than about 7 degrees, or greater than about 8 degrees, or greater than about 10 degrees, or greater than about 15 degrees, or greater than about 20 degrees. In some embodiments, the angle $\Omega$ is no more than about 30 degrees.

A light coupling element of the present description may be a unitary construction. A unitary construction is a single piece construction that does not have any internal interfaces, joints, or seams. A unitary construction can be made by molding (e.g., injection molding a thermoplastic), casting or machining, for example.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially perpendicular" is not otherwise clear to one of ordinary skill in the art in the context in which it is used and described in the present description, "substantially perpendicular" will mean within 30 degrees of perpendicular. Directions or surfaces described as substantially perpendicular to one another may, in some embodiments, be within 20 degrees or within 10 degrees of perpendicular or may be nominally perpendicular.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein.

Therefore, it is intended that this disclosure be limited only by the claims and the equivalents thereof.

What is claimed is:

1. A light coupling element, comprising:
a plurality of waveguide attachment features for receiving and permanently attaching to a plurality of optical waveguides, each waveguide attachment feature comprising an entrance end opposite a terminal end, the entrance ends of the attachment features arranged at a pitch Pe, the terminal ends of the attachment features arranged at a pitch Pt; and
a light redirecting member disposed closer to the terminal ends, and farther from the entrance ends, of the attachment features and comprising an input surface, a reflecting side and an exit surface such that when an optical waveguide is received and permanently attached at each attachment feature, a central light ray emitted by each optical waveguide enters the light redirecting member through the input surface as an input central light ray, is redirected by the reflecting side into a redirected central light ray and exits the light redirecting member at the exit surface as an output central light ray, the output central light ray intersecting the exit surface at an exit point, each attachment feature corresponding to a different exit point at the exit surface, the exits points corresponding to the attachment features arranged at a pitch Px not equal to Pe, wherein Pt is substantially equal to one of Px and Pe, or Pe>Pt>Px,
wherein the plurality of waveguide attachment features comprise first and second grooves for receiving and aligning respective first and second optical waveguides, the reflecting side comprises first and second light redirecting surfaces corresponding to the respective first and second grooves, such that when first and second optical waveguides are received and aligned in the respective first and second grooves and emit respective first and second input central light rays, the first and second light redirecting surfaces receive and reflect the input central light rays into respective first and second redirected central light rays so that the redirected central light rays exit the light coupling element as respective first and second output central light rays, wherein the first and second input central light rays define an angle $\alpha 1$ therebetween and the first and second output central light rays define an angle $\alpha 2$ therebetween, and
wherein one of $\alpha 1$ and $\alpha 2$ is less than about 1 degree and the other of $\alpha 1$ and $\alpha 2$ is greater than about 2 degrees.

2. The light coupling element of claim 1, wherein:
$\alpha 1$ is greater than about 2 degrees;
the first input and redirected central light rays define an angle $\beta 1$ therebetween greater than about 30 degrees;
the second input and redirected central light rays define an angle $\beta 2$ therebetween greater than about 30 degrees; and
$\alpha 2$ is less than about 1 degree.

3. The light coupling element of claim 1, wherein:
$\alpha 1$ is less than about 1 degree;
the first input and redirected central light rays define an angle $\beta 1$ therebetween greater than about 30 degrees;
the second input and redirected central light rays define an angle $\beta 2$ therebetween greater than about 30 degrees; and
$\alpha 2$ is greater than about 2 degrees.

4. The light coupling element of claim 1, wherein the plurality of waveguide attachment features comprise first and second grooves, the reflecting side comprises first and second curved surface portions projecting from a substantially planar surface and configured to change direction of light received from respective first and second optical waveguides supported by the first and second grooves, the first and second curved surface portions intersecting the substantially planar surface at substantially oval shaped respective first and second borders, each border comprising a shorter minor axis orthogonal to a longer major axis, the longer major axes of the first and second borders defining an angle δ therebetween greater than about 2 degrees.

5. The light coupling element of claim 1, wherein for each optical waveguide and corresponding attachment feature, the central light ray emitted by the optical waveguide is received by the reflecting side from the input surface along an incident direction, the reflecting side changing the direction of the received light to a different redirected direction, the incident and redirected directions defining a propagation plane corresponding to the attachment feature, wherein the propagation planes corresponding to at least two different attachment features define an angle θ therebetween greater than about 2 degrees.

6. The light coupling element of claim 1, wherein the reflecting side comprises a plurality of light redirecting surfaces, each light redirecting surface having an axis of revolution and configured to receive an input central light ray emitted by an optical waveguide received and aligned in a corresponding waveguide attachment feature along an incident direction, the incident direction and the axis of revolution defining an incident plane corresponding to the light redirecting surface, the incident planes corresponding to at least two different light redirecting surfaces defining an angle ω therebetween greater than about 2 degrees.

7. The light coupling element of claim 1, wherein the reflecting side comprises a plurality of light redirecting surfaces, each light redirecting surface configured to receive an input central light ray emitted by an optical waveguide received and aligned in a corresponding waveguide attachment feature along an incident direction intersecting the light redirecting surface at an incident location, the light redirecting surface defining a first principal direction at the incident location corresponding to a direction along which the light redirecting surface comprises a minimum curvature, the incident and first principal directions defining a first plane, the first planes corresponding to at least two different light redirecting surfaces defining an angle Ω therebetween greater than about 2 degrees.

8. The light coupling element of claim 1, wherein Pe−Px≥5 microns.

9. The light coupling element of claim 1, wherein Pe is about 265 microns and Px is about 250 microns.

* * * * *